United States Patent
Furuya et al.

(10) Patent No.: US 7,848,010 B2
(45) Date of Patent: Dec. 7, 2010

(54) OPTICAL APPARATUS, AND WAVELENGTH CONVERSION LASER LIGHT SOURCE, IMAGE DISPLAY APPARATUS, AND LASER LIGHT SOURCE DEVICE ADOPTING SUCH OPTICAL APPARATUS

(75) Inventors: Hiroyuki Furuya, Osaka (JP); Kazuhisa Yamamoto, Osaka (JP); Akifumi Aono, Ehime (JP); Masahide Yamauchi, Osaka (JP); Masashi Yamauchi, legal representative, Osaka (JP); Shinichi Kadowaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 32 days.

(21) Appl. No.: 12/494,947

(22) Filed: Jun. 30, 2009

(65) Prior Publication Data
US 2009/0323172 A1 Dec. 31, 2009

(30) Foreign Application Priority Data
Jun. 30, 2008 (JP) .............................. 2008-170069

(51) Int. Cl.
*G02F 2/02* (2006.01)
*H01S 3/10* (2006.01)
(52) U.S. Cl. .................... 359/326; 359/328; 372/22
(58) Field of Classification Search ................ 359/326, 359/328, 329; 372/21, 22, 34, 36
See application file for complete search history.

(56) References Cited

U.S. PATENT DOCUMENTS

2007/0153850 A1* 7/2007 Scripsick et al. .............. 372/39
2009/0027765 A1* 1/2009 Kamijima ................... 359/328
2009/0174929 A1* 7/2009 Egawa ........................ 359/328

FOREIGN PATENT DOCUMENTS

| JP | 7-79046 | 3/1995 |
|----|---------|--------|
| JP | 7-244309 | 9/1995 |
| JP | 2000-305120 | 11/2000 |
| JP | 3412906 | 3/2003 |
| JP | 2004-157217 | 6/2004 |

* cited by examiner

*Primary Examiner*—Hemang Sanghavi
(74) *Attorney, Agent, or Firm*—Wenderoth, Lind & Ponack, L.L.P.

(57) ABSTRACT

A wavelength conversion laser light source includes: a non-linear optical crystal of an oxygen octahedral structure, having added thereto a metal ion in other components than a main component; a light source for projecting light into the non-linear optical crystal in an operation mode; and a refractive index recovery mechanism for carrying out a recovery operation for recovering a refractive index of said non-linear optical crystal as shifted overtime due to light projected into the non-linear optical crystal in the operation mode with an applied external energy into the non-linear optical crystal in a non-operation mode in which light is not injected to the non-linear optical crystal.

20 Claims, 20 Drawing Sheets

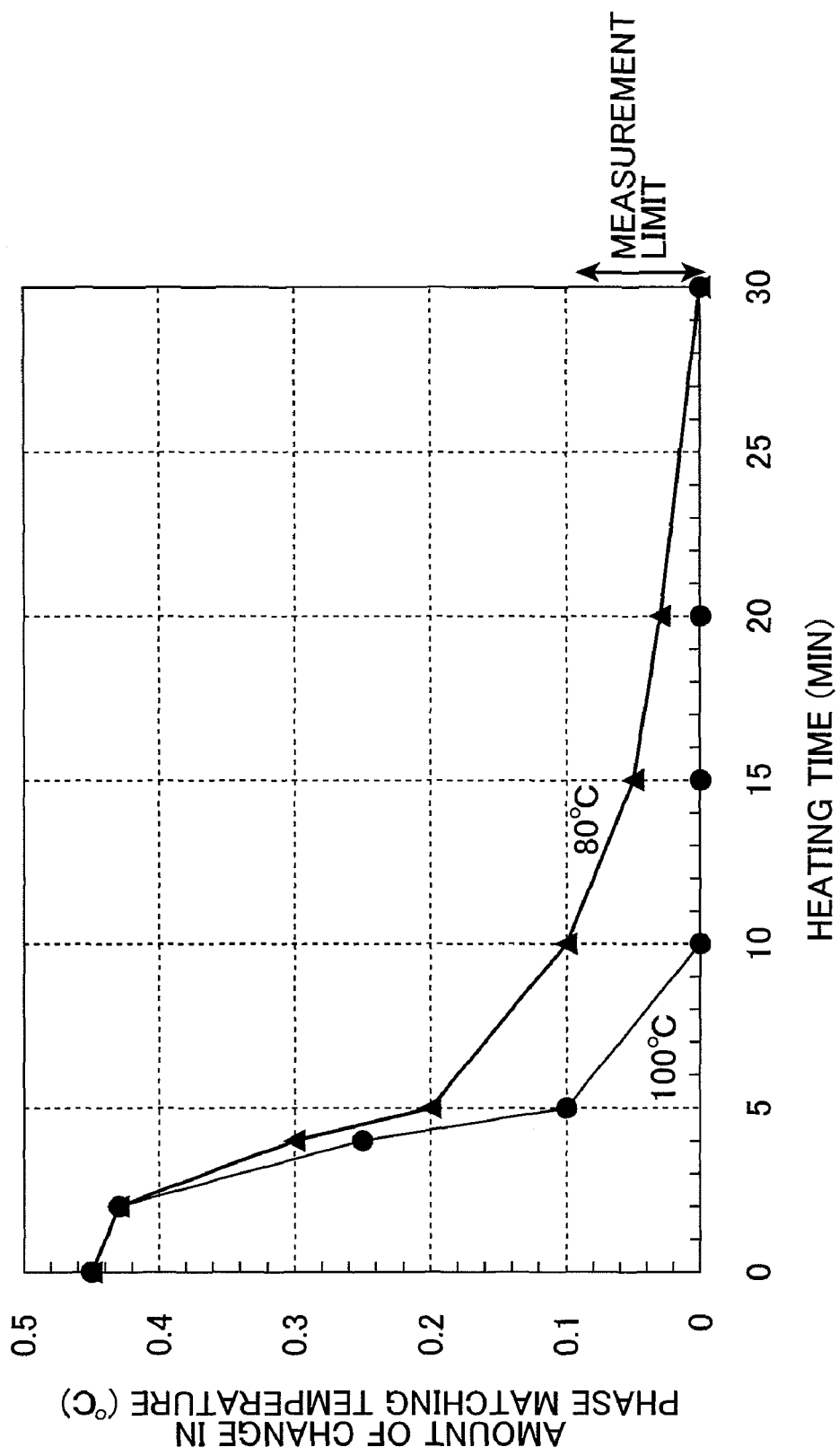

FIG.19A
FIG.19B
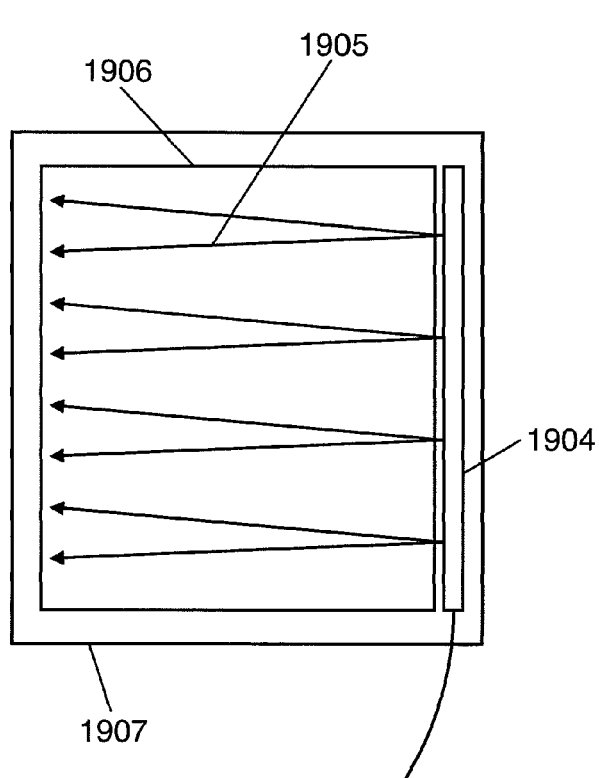
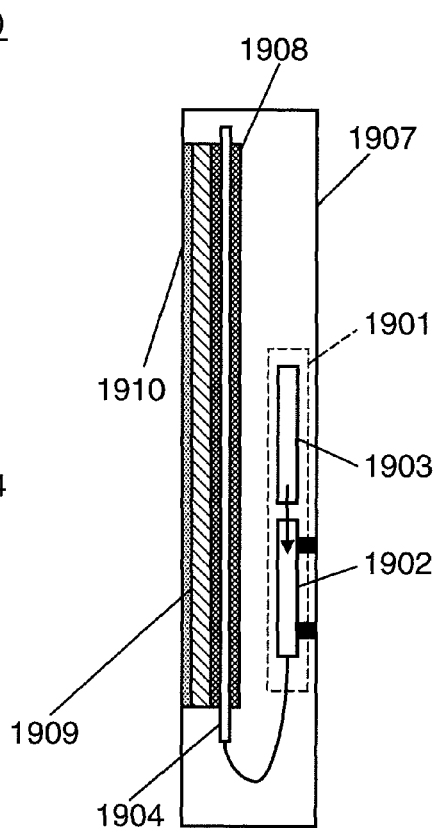
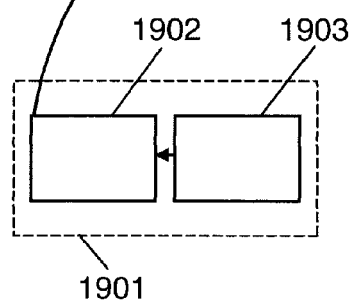

OPTICAL APPARATUS, AND WAVELENGTH CONVERSION LASER LIGHT SOURCE, IMAGE DISPLAY APPARATUS, AND LASER LIGHT SOURCE DEVICE ADOPTING SUCH OPTICAL APPARATUS

BACKGROUND OF THE INVENTION

1. Field of the Invention

The preset invention relates to an optical apparatus including non-linear optical crystal, and a wavelength conversion laser light source, an image display apparatus and a laser light source device adopting such optical apparatus.

2. Description of the Background Art

Conventionally, a variety of wavelength conversion laser light sources have been developed and made into practical applications, wherein a visible laser beam is obtained, such as a green light or an ultraviolet ray which is obtained by further converting the green light, etc., through the wavelength conversion using the non-linear optical effects of a laser beam emitted from the Nd: YAG laser, or the Nd: $YVO_4$ laser, for example, as disclosed in Japanese unexamined Patent Publication No. 2004-157217 and Japanese unexamined Patent Publication No. 2000-305120. These converted light beams are used for laser processing, or a laser display, etc.

FIG. 1 shows a typical structure of a conventional wavelength conversion laser light source using the non-linear optical effect. In order to obtain the non-linear optical effect, it is required to adopt the non-linear optical crystals having the birefringence. Examples of such non-linear optical crystals having the birefringence include: $LiB_3O_5$ (LBO: lithium triborate), $KTiOPO_4$ (KTP: Potassium Titanyl Phosphate), $CsLiB_6O_{10}$(CLBO: Cesium Lithium Borate); or $LiNbO_3$ (PPLN:Lithium Tantalate), and $LiTaO_3$(PPLT: Lithium Tantalate) having a periodical polarization inversion structure, etc.

As shown in FIG. 1, a wavelength conversion laser light source 100 includes a fundamental wave light source 101, a collective lens 108, a non-linear optical crystals (wavelength conversion element) 109, a re-collimating lens 111, a wavelength-dividing mirror, a temperature holder 116 such as a heater or the like for holding the temperature of the non-linear optical crystals constant, a control unit 115 for controlling a laser output, and a temperature controller 122 for controlling the temperature of the non-linear optical crystals provided in the control unit 115. For the fundamental wave light source 101, Nd: YAG laser, Nd: $YVO_4$ laser, fiber laser using Yb doped fiber having a wavelength of 1.06 µm are generally used.

Here, the actual operations will be explained, which generate the second harmonic wave having a wavelength of 0.532 µm which is around ½ of wavelength (1.06 µm) of the fundamental wave.

The laser beam having a wavelength of 1.06 µm as emitted from the fundamental wave light source 101 is converged into the non-linear optical crystals 109 by the collective lens 108. Here, the non-linear optical crystals 109 needs to have the refractive index for the light having the wavelength of 1.06 µm matched with the refractive index for the light having the wavelength of 0.532 µm to be generated (phase matching condition). Generally, the refractive index for the crystals varies according to temperature conditions of the crystals. Therefore, the temperature of the crystals needs to be maintained constant. For this reason, the non-linear optical crystals are placed in the temperature holder 116, and are maintained at a predetermined temperature suited for the kind of the crystals. For example, when adopting the LBO crystals, in order to obtain the type-1 non-critical phase matching (the phase matching state), the LBO crystals need to be maintained at a temperature in a range of 148° C. to 150° C.

On the other hand, when adopting $LiNbO_3$ crystals having a periodical polarization inversion structure, it is possible to determine the temperature and the wavelength for the phase matching condition by selecting the period for the periodical polarization inversion structure. However, in order to maintain the phase matching condition, it is required to keep the element temperature of the wavelength of the fundamental wave constant (see Japanese unexamined Patent Publication No. 2004-157217 and Japanese unexamined Patent Publication No. 2000-305120). Incidentally, the method of obtaining a phase matching condition by adjusting the temperature using $LiNbO_3$ crystals without having a periodical polarization inversion structure is disclosed, for example, Japanese Patent No. 3412906.

However, it has been found that for some kinds of the non-linear optical crystals to be adopted as the wavelength conversion element, the temperature of the element is raised by absorbing the fundamental wave and the harmonic wave as generated, which makes the phase matching temperature (wavelength) vary according to the output level of the harmonic wave, thereby presenting a problem in that a high conversion efficiency cannot be realized.

SUMMARY OF THE INVENTION

An object of the present invention is to provide an optical apparatus, and a wavelength conversion laser light source, an image display apparatus, and a laser light source device adopting the optical apparatus, which ensure stable operations over a long period of use.

In order to achieve the above object, an optical apparatus according to one aspect of the present invention includes: a non-linear optical crystal of an oxygen octahedral structure, having added thereto a metal ion in other components than a main component; a light source for projecting light into the non-linear optical crystal in an operation mode; and a refractive index recovery mechanism, which carries out a recovery operation in a non-operation mode in which light is not injected to the non-linear optical crystal with an applied external energy to the non-linear optical crystal, for recovering a refractive index of the non-linear optical crystal as shifted overtime due to light projected into the non-linear optical crystal in the operation model.

For the non-linear optical crystal, it is preferable to adopt $LiNbO_3$ or $LiTaO_3$ of congruent composition having added thereto not less than 5 mol of Mg or $LiNbO_3$, $LiTaO_3$, or $KTiOPO_4$ of stoichiometric composition having added thereto not less than 1 mol of Mg.

In the above structure, the congruent composition indicates a so-called congruent melting composition where the melting composition coincides with the mono-crystal composition obtained from the melt. The stoichiometric composition indicates a ideal ratio composition (ratio composition close to chemical formula).

With the recovery operation by the refraction index recovery mechanism, electrons (hole) trapped in lattice defects in the non-linear optical crystals are excited with an applied external energy, to release the electrons from the non-linear optical crystal, thereby recovering the refractive index of the non-linear optical crystals. As a result, it is possible to perform the wavelength conversion under stable conditions even over an overall operation time of long period of time.

BRIEF DESCRIPTION OF THE DRAWINGS

FIG. 4 is a graph explaining how the phase matching temperatures recovered from shifted phase matching temperature over time with an applied thermal energy when recovery temperatures are set to 80° C. and 100° C. respectively;

FIG. 19A is an explanatory view schematically showing an example structure of a liquid crystal display adopting a laser light source of the present invention;

FIG. 19B is a cross-sectional view of the liquid crystal display of FIG. 19A;

DETAILED DESCRIPTION OF THE PREFERRED EMBODIMENTS OF THE INVENTION

Hereinafter, embodiments of the present invention will be described with reference to the drawings.

A wavelength conversion laser light source (optical apparatus) in accordance with the first embodiment of the present invention will be described with reference to FIG. 5.

A wavelength conversion laser light source 200 in accordance with the present embodiment has a refraction index recovery mechanism (to be described in details later). The refraction index recovery mechanism recovers a refraction index of a wavelength conversion element 209 whose refraction index has changed due to light entered to the wavelength conversion element (non-linear optical crystals) with an applied of thermal energy to the wavelength conversion element 209 in the non-operation mode in which light has not been applied to the wavelength conversion element (non-linear optical crystals) 209. With the recovery operation by the refraction index recovery mechanism, electrons (hole) trapped in lattice defects in the non-linear optical crystals of the wavelength conversion element 209 are excited with an applied of an external energy (thermal energy), to release the electrons from the wavelength conversion element 209, thereby recovering the refractive index of the wavelength conversion element 209. With the foregoing refraction index recovery mechanism, it is possible to realize the wavelength conversion laser light source capable of performing wavelength conversion under stable conditions without suffering from deterioration over a long overall operation time (accumulated operation time).

Figure 5:
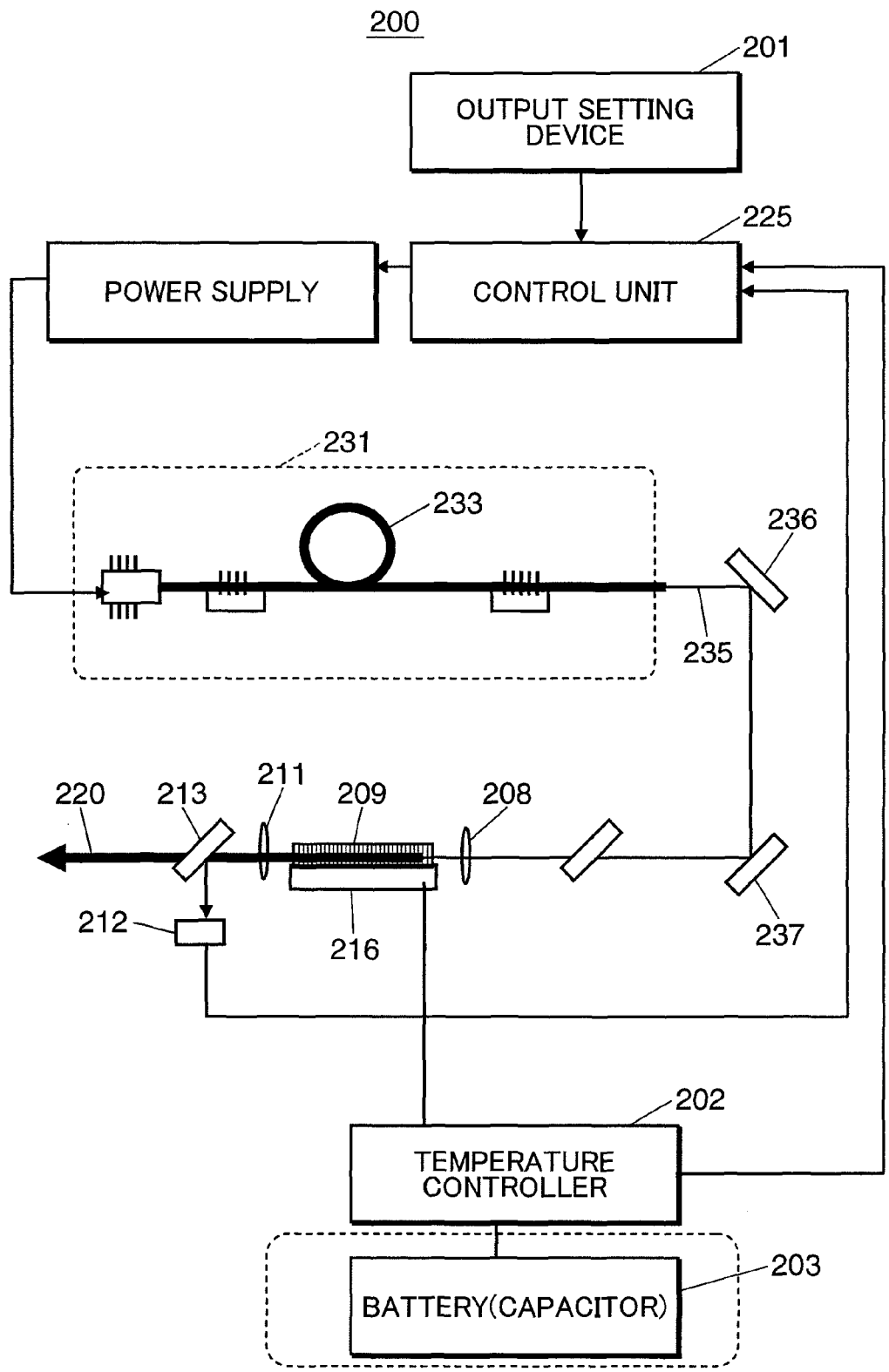
FIG. 5 is an explanatory view schematically showing the structure of a wavelength conversion laser light source in accordance with one embodiment of the present invention.

As shown in FIG. 5, the wavelength conversion laser light source 200 includes a fundamental wave light source 231, a first dichroic mirror 236, a second dichroic mirror 237, a collective lens 208, a non-linear optical crystals (wavelength conversion element) 209, a re-collimating lens 211, a photo detector (photodiode) 212, a beamsplitter 213, etc.

For the fundamental wave light source 231, adopted is a fiber laser light source adopting a Yb doped fiber 233. It is advantageous to adopt a fiber laser light source in that the oscillation wavelength and the spectrum width can be determined as desired. Therefore, when adopting such fiber laser light source, it is possible to significantly improve the conversion efficiency from a fundamental wave into a harmonic wave by reducing the spectrum width.

The fundamental wave 235 generated by the fundamental wave light source (fiber laser light source) 231 is collected into the non-linear optical crystals (wavelength conversion element) 209 by the collective lens 208. In the present embodiment, Mg: $LiNbO_3$ crystal element (MgLN element) is adopted as the non-linear optical crystals, wherein the periodical polarization inversion structure is formed.

The wavelength conversion laser light source 200 in accordance with the present embodiment is provided with the temperature holder 216 under the lower surface of the wavelength conversion element 209. This temperature holder 216 serves to maintain the wavelength conversion element 209 at a predetermined holding temperature. For the temperature holder 216, adopted is a Peltier device.

The second harmonic wave having wavelength converted by the wavelength conversion element 209 is formed into a parallel beam by the re-collimating lens 211. After having formed into the parallel beam, the beam is separated by the beamsplitter 213 into a fundamental wave which has not been converted to the harmonic wave, and the harmonic wave as being converted.

The laser output is controlled with current supplied to the pump light source of the fundamental wave light source 231. Incidentally, such method of controlling the fundamental wave input may be adopted, wherein a part of the fundamental wave may be taken out directly before the fundamental wave is incident into the wavelength conversion element 209, to monitor the incident light into the wavelength conversion element 209.

Figure 1:
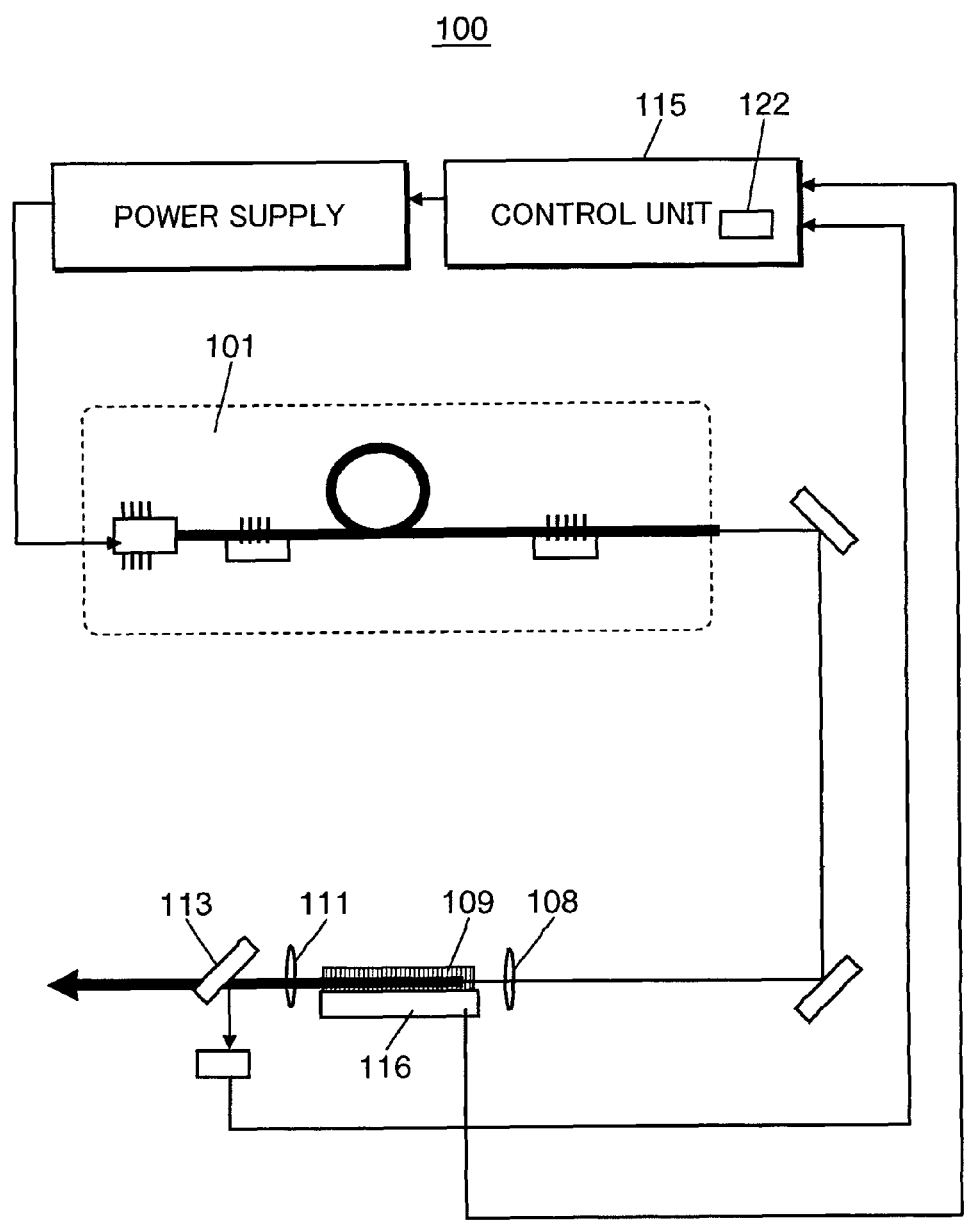
FIG. 1 is an explanatory view schematically showing the structure of a wavelength conversion laser light source.
Figure 2A:
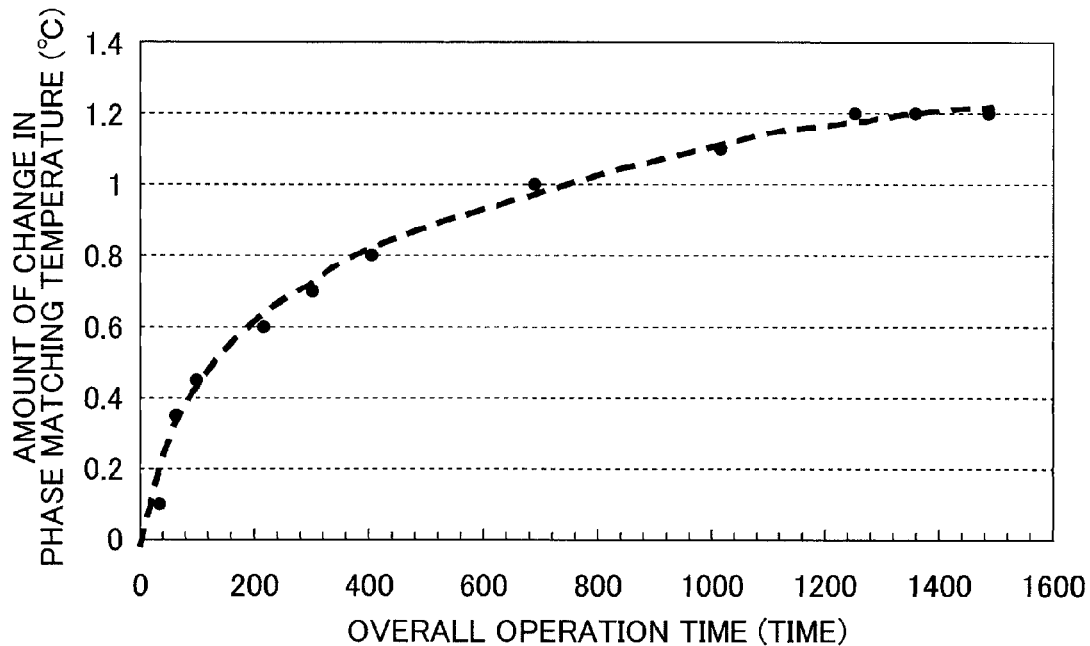
FIG. 2A is a graph showing changes in phase matching temperature over time of a wavelength conversion element.
Figure 2B:
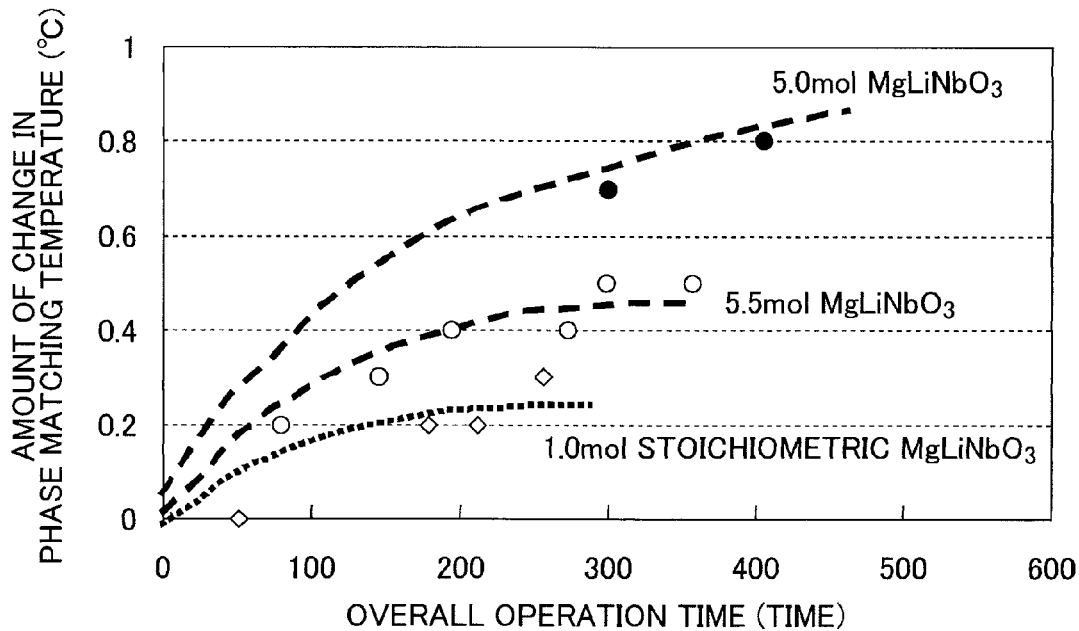
FIG. 2B is a graph showing changes in phase matching temperatures over time with respect to different materials for the wavelength conversion element.

FIG. 2 shows shift in phase matching temperature over time of the wavelength conversion element 209 when driving at an output power of 1 W. In the graphs of FIG. 2A and FIG. 2B, the x-axis indicates an overall operation time, and the y-axis indicates a shift in temperature from the phase matching temperature of the wavelength conversion element 209. As shown in the graph of FIG. 2A, the phase matching temperature of the wavelength conversion element 209 shifts by 0.4° C. when the overall operation time has reached 100 hours, by 0.6° C. when the overall operation time has reached 200 hours, and 1.0° C. when the overall operation time has reached 800 hours. The inventors of the present application have found that "changes in photorefractive" are the cause of gradual shifts in phase matching temperature of the wavelength conversion element 209.

Conventionally, photorefractive is observed in $LiNbO_3$ (lithium niobate) crystal, and it is known that harmonic wave light such as green light is generated immediately upon having the harmonic wave light entered in the $LiNbO_3$. It has been reported that such instantly generated photorefractive can be suppressed in the congruent composition $LiNbO_3$ crystal having not less than 5.0 mol magnesium added, or the stoichiometric composition $LiNbO_3$ having not less than 1.0 mol magnesium added. However, such composition is effective only for the instantaneously generated photorefractive.

As a result of researches, the inventors of the present invention have found that even when adopting $LiNbO_3$ crystal having added therein not less than 5.0 mol of Mg, or the stoichiometric composition $LiNbO_3$ having added therein not less than 1.0 mol of Mg for the wavelength conversion element having formed therein the periodical polarization inversion structure, phase matching temperatures gradually shift over time when the overall operation time has reached the order of 100 hours. In view of the foregoing, the present embodiment provides means dealing with changes over time in phase matching conditions such as phase matching temperature, phase matching wavelength, etc., which is effective particularly when adopting as a light conversion element, non-linear optical crystals having formed therein the periodical polarization inversion structure, such as $LiNbO_3$ crystals having added thereto Mg, $LiNbO_3$ with elements substituted, etc.

FIG. 2B shows comparison between different element materials with regard to changes in phase matching temperature, and specifically shows differences in changes in phase matching temperature between when adopting as a different element material, Mg:$LiNbO_3$ crystals (5.0 mol in the Mg concentration) of the congruent composition and Mg:$LiNbO_3$ crystals of the stoichiometric composition (1.0 mol in the Mg concentration).

As can be seen from FIG. 2B, changes in phase matching temperature can be suppressed by around 60% by setting the concentration of Mg from 5.0 to 5.5 mol even when the same material (Mg:$LiNbO_3$ crystals of the congruent composition) is adopted. Furthermore, it was found that changes in phase matching temperature can be suppressed to around 40% when adopting (Mg:$LiNbO_3$ crystals of the stoichiometric composition (1.0 mol in the Mg concentration) as compared to the case of adopting Mg:$LiNbO_3$ crystals of the congruent composition (5.0 mol in the Mg concentration). In view of the foregoing, it is preferable to adopt as a material of wavelength conversion element 209, $LiNbO_3$ or $LiTaO_3$ crystals the congruent composition having added therein 5.5 mol of Mg. When adopting these materials for the wavelength conversion element 209, the effects as achieved from the characteristic structure of the present embodiment and the second and third embodiments to be described later become more noticeable.

$LiNbO_3$ or $LiTaO_3$ crystals have lattice defects in the crystals. However, by adding Mg to these crystals, electrons (hole) trapped in lattice defects can be reduced. Here, $LiNbO_3$ of stoichiometric composition contain have less lattice defects that that of congruent composition, and for materials of the wavelength conversion element, it is preferable to adopt $LiNbO_3$, $LiTaO_3$, or $KTiOPO_4$ of stoichiometric composition having added thereto not less than 1 mol of Mg.

First Embodiment

The wavelength conversion laser light source (optical apparatus) 200 in accordance with the present embodiment is provided with refractive index recovery mechanism for recovering a shifted refraction index of non-linear optical crystals which can be the cause of shifting in phase matching temperature over time, to a refractive index in an initial state.

In the wavelength conversion laser light source 200 of the present embodiment, adopted for the wavelength conversion element 209 is Mg: $LiNbO_3$ (Mg concentration: 5.0 mol) having the periodical polarization inversion structure. The phase matching temperature of the wavelength conversion element 209 is set to 30° C., and in the operation mode, the temperature of the wavelength conversion element 209 is set to 30° C. by the temperature holding section 216. Namely, in the present embodiment, the operation temperature of the wavelength conversion element 209 in the operation mode wherein light is entered in to the wavelength conversion element 209 is set to 30° C.

According to the wavelength conversion laser light source 200, with an application of a fundamental wave with a wavelength of 1064 nm and a power of 6 W, a harmonic wave of 1.5 W (green light: 532 nm) can be generated by the wavelength conversion by the wavelength conversion element 209.

Figure 3A:
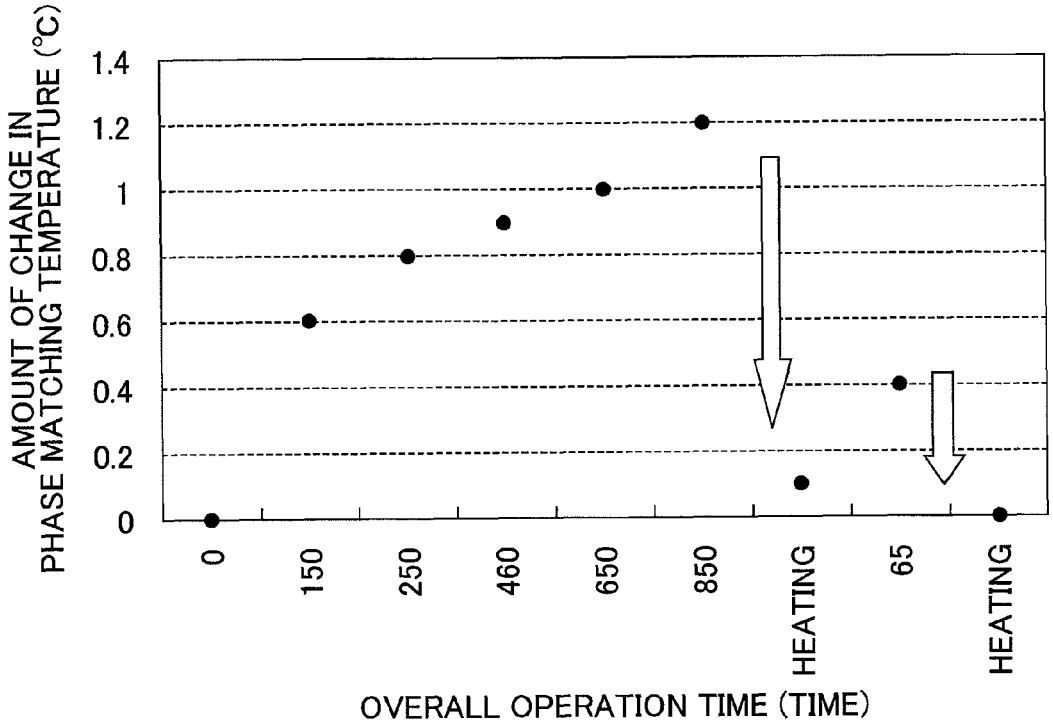
FIG. 3A is a graph showing the relationship between an overall operation time and changes in phase matching temperature of a wavelength conversion element and a recovery with an applied heat from the phase matching temperature as shifted.

In the graph of FIG. 3A, the x-axis indicates an overall operation time (accumulated operation time), and the y-axis indicates changes in amount of the phase matching temperature of the wavelength conversion element 209. As can be seen from FIG. 3A, as the overall operation time becomes longer, an amount of shift in phase matching temperature increases. After an elapse of time of 850 hours from the start of operation, the phase matching temperature was shifted to a temperature 1.2° C. higher than the initial phase matching temperature.

According to the present embodiment, in order to have the wavelength conversion characteristics of the wavelength conversion element 209 recovered from the shifted phase matching temperature over time, the wavelength conversion element 209 is heated to and maintained at a predetermined recovery temperature.

Specifically, when an overall operation time of the wavelength conversion element 209 has reached 850 hours, the temperature of the temperature holding section 216 is increased in two minutes from 30° C. (operation temperature) to 100° C. (recovery temperature). The temperature of the wavelength conversion element 209 is maintained at 100° C. for 5 minutes, and after an elapse of 5 minutes, the temperature of the wavelength conversion element 209 is lowered back to 30° C. As a result, the phase matching temperature of the wavelength conversion element 209 can be recovered almost to the initial phase matching temperature (within the detection error range of the temperature detecting section). After the phase matching characteristic of the wavelength conversion element 209 has been recovered by the recovery operation, the wavelength conversion element 209 was operated under the same conditions until the overall operation time reached 65 hours. Thereafter, the temperature of the temperature holding section 216 is increased to 100° C. and held at 100° C. for 5 minutes, and the temperature of the temperature holding section 216 is then lowered back to 30° C. again in two minutes in the same manner as before. As a result of this experiment, the inventors of the present application confirmed that the phase matching temperature of the wavelength conversion element 209 was recovered almost to the initial phase matching temperature.

The reason why the phase matching temperature can be recovered is that with an applied external energy, electrons (hole) trapped in lattice defects in the non-linear optical crystals of the wavelength conversion element 209 are released by lattice oscillations.

Furthermore, experiments were conducted to check the heating temperature (recovery temperature) required for recovering the wavelength conversion element 209 whose phase matching temperature was shifted due to deterioration over time.

Figure 3B:
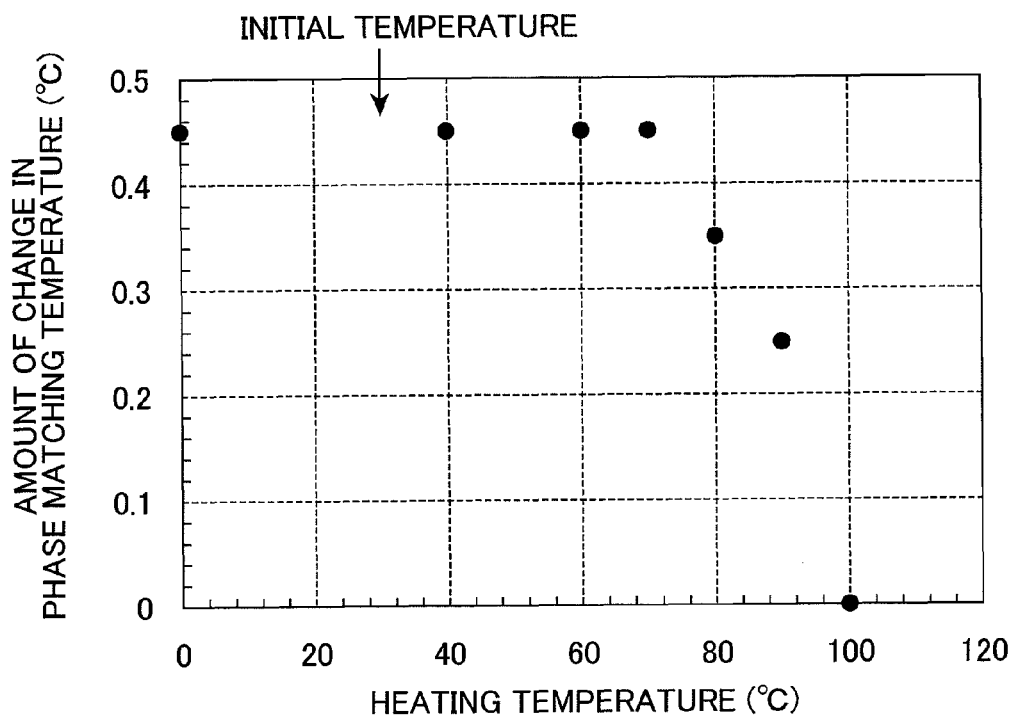
FIG. 3B is a graph showing the relationship between the recovery temperature and changes in phase matching temperature of a wavelength conversion element and a recovery with an applied heat from the phase matching temperature as shifted.

Specifically, the temperature of the wavelength conversion element 209 was increased from the initial temperature (30° C.) to the target recovery temperature in two minutes, and was maintained at the recovery temperature in 5 minutes. The temperature of the wavelength conversion element 209 was then lowered back to 30° C. in 2 minutes. The results of this experiment are shown in FIG. 3B. In the graph of FIG. 3B, the x-axis indicates the target heating temperature, and the y-axis indicates an amount of shift from the initial phase matching temperature, wherein recovered amounts in phase matching temperature are plotted. The foregoing experiment was conducted with respect to the wavelength conversion element 209 whose the phase matching temperature had shifted to the higher temperature by 0.45° C. due to deterioration over time. As can be seen from the graph of FIG. 3B, the phase matching temperature started being recovered when the temperature of the wavelength conversion element 209 was raised to 80° C., and the phase matching temperature was completely recovered when the temperature of the wavelength conversion element 209 was raised to 100° C. Here, the higher is the heating temperature of the wavelength conversion element 209, the lattice oscillations become greater and therefore greater effects can be achieved. In view of the foregoing, it is preferable to set the recovery temperature of the wavelength conversion element 209 to 80° C. or higher, and it is more preferable to set the recovery temperature of the wavelength conversion element 209 to 100° C. or higher.

Incidentally, when the temperature of the element is cooled from an initial temperature to 0° C., the phase matching temperature has not recovered. It is therefore understood that the phase matching temperature has recovered not by the thermal shock but by the lattice vibrations with an applied thermal energy to the element.

FIG. 4 is a plot diagram which shows how the phase matching temperature recovers with respect to the heating time when the heating temperature is set to 80° C., and 100° C. It is understood from the graph of FIG. 4 that the phase matching temperature recovered considerably in 5 minutes after the wavelength conversion element 209 started being heated to 80° C., and recovered to the point below the measuring limit in 10 minutes after the element started being heated. Moreover, when the heating temperature (recovery temperature) was set to 100° C., the phase matching temperature recovered to the point below the measuring limit in 5 minutes after the wavelength conversion element 209 started being heated. As is clear from the results shown in FIG. 4, some effects of recovering the phase matching temperature was achieved even before the heating time (temperature holding time) reached 5 minutes.

In view of the foregoing, it is understood, for the wavelength conversion light source, which adopts as the wavelength conversion element 209, Mg: LiNbO$_3$ (Mg concentration: 5.0 mol) having the periodical polarization inversion structure, that the phase matching temperature can recover from the shifted phase matching temperature over time considerably by heating the wavelength conversion element 209 maintaining it at the heating temperature of 80° C. or higher, preferably 100° C. or higher for 5 minutes or longer.

Figure 6:
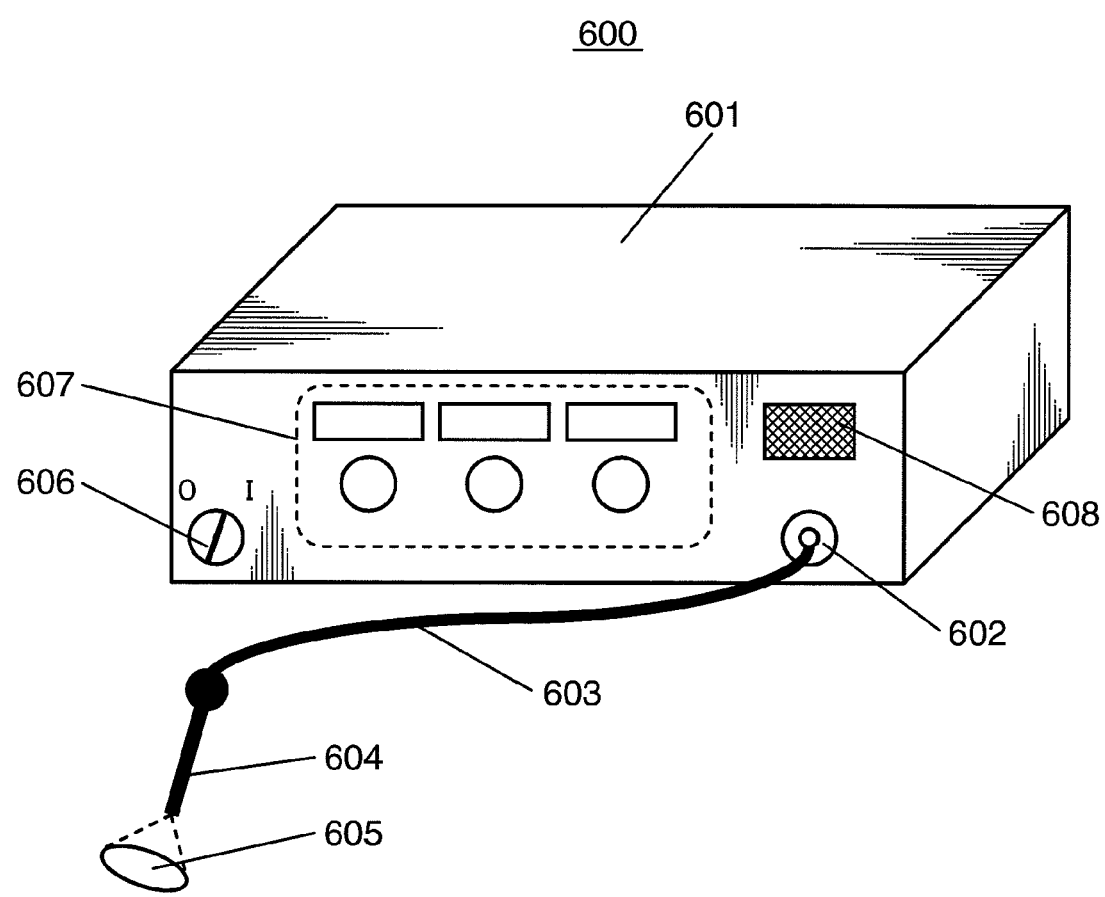
FIG. 6 is an explanatory view schematically showing an example structure of a laser light source provided with fiber adopting the laser light source in accordance with one embodiment of the present invention.

FIG. 6 shows one example of a wavelength conversion laser light source (laser light source device) in accordance with the present embodiment. The laser device 600 of the present embodiment includes a light source main body 601, a delivery fiber 603 connected to the light source main body 601 via an output connector 602, for guiding the laser beam to a desired area to be irradiated with, and a hand piece 604, etc. The light source main body 601 stores therein the wavelength conversion laser light source shown in FIG. 5. Upon turning ON a power source switch 606 for switching ON/OFF the main power supply of the light source main body 601, the laser device 600 starts being warmed up. When the laser device 600 becomes ready to output a laser beam, a ready display section 608 is lighted. In this state, an output value for laser light is set by the output setting section 607, and whereby a laser beam 605 is emitted from the hand peace 604 connected to the delivery fiber 603.

Figure 13:
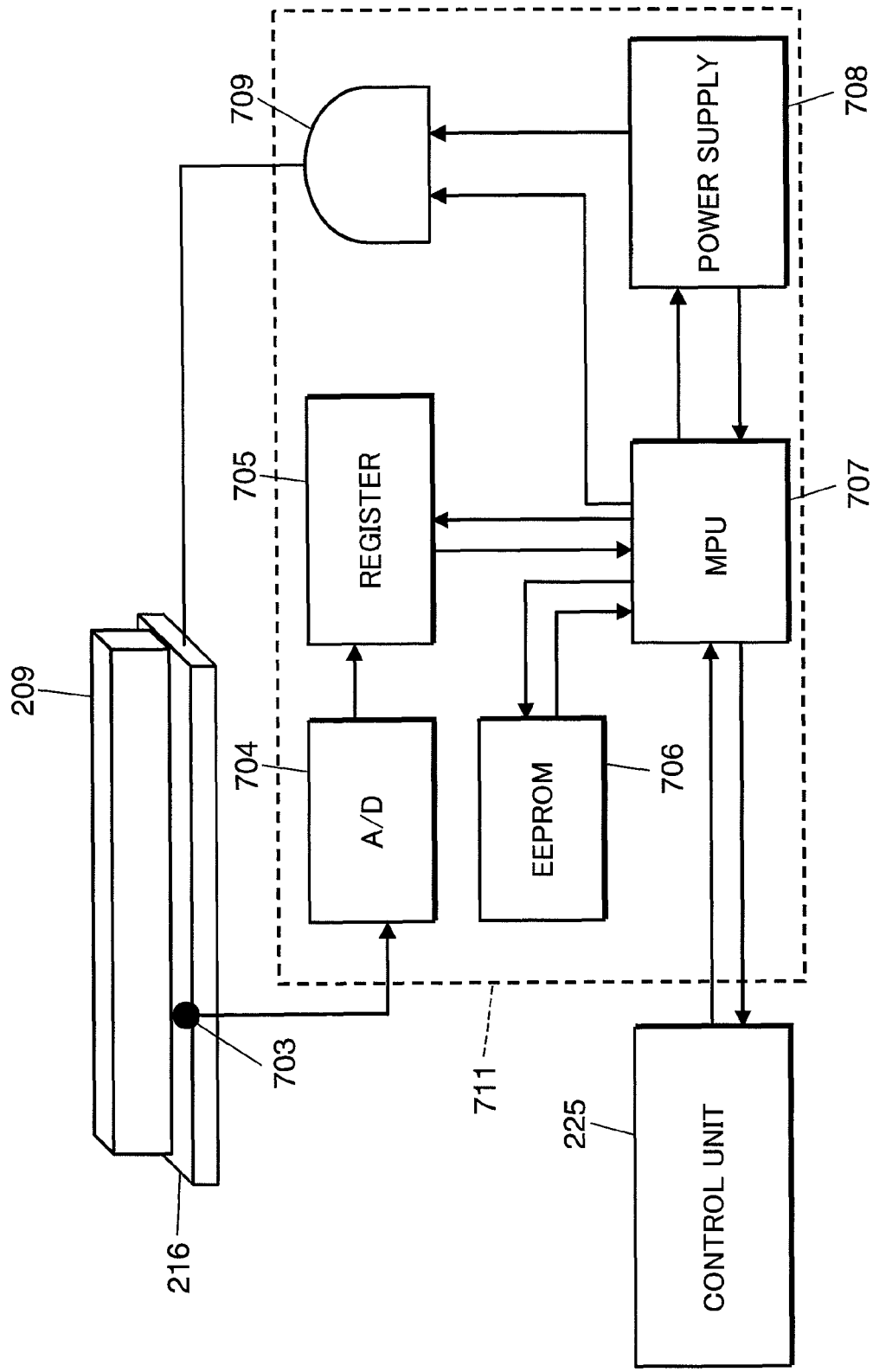
FIG. 13 is a block diagram showing the schematic structure of the control unit and the temperature controller of the wavelength conversion element provided in the wavelength conversion laser light source in accordance with one embodiment of the present invention.

FIG. 13 is a block diagram showing schematic structures of the control unit 255 and the temperature controller 711 of the wavelength conversion element 209 of the wavelength conversion laser light source in accordance with the present embodiment.

As shown in FIG. 13, the temperature controller 711 includes a power supply 708, a thermistor 703, an A/D converter 704 for converting a temperature signal from the thermistor 703 into a digital value, a register 705 storing a temp. signal as converted into a digital value by the A/D converter 704, EEPROM 706 for storing an element operation temperature $T_{sv}$, an element recovery temperature Tan, a holding time, a table of temperatures of the wavelength conversion element 209 corresponding to respective output powers of the harmonic wave, input current required, etc., an MPU 707 to which the data indicative of a set value for the output power of the harmonic wave from the control unit 225 is transferred from the control unit 225, and a switch 709 which controls the PWM (Pulse Width Modulation) with respect to the current waveform to be supplied to the temperature holder 216 from the power supply 708.

In the present embodiment, the temperature holder 216 is controlled in the following manner. That is, the information indicative of the temperature of the wavelength conversion element 209 corresponding to the output level (output power level) of the harmonic wave as stored in the EEPROM 706 is obtained. Then, the MPU 707 compares and computes the temperature of the wavelength conversion element 209 as obtained with the temperature present value stored in the register 705. As a result, the temperature holder 216 is controlled based on the current to be applied to the temperature holder 216 from the power supply 708 in view of the polarity and the waveform of the current under the PWM (Pulse Width Modulation) control by giving instructions to the switch 709.

The wavelength conversion element 209 is placed on the temperature holder 216, and the temperature of the wavelength conversion element 209 is monitored indirectly by monitoring the temperature of the temperature holder 216. The temperature signal from the thermistor 703 is converted into a digital value by the A/ID converter 704 to be stored in the register 705. The temperature signal from the thermistor 703 is converted into a digital value by the A/D converter 704 to be stored in the register 705. In the EEPROM 706, stored beforehand together with input currents is a table for the temperatures of the wavelength conversion element, which respectively correspond to the output powers of the harmonic wave.

The refraction index recovery mechanism is made up of the temperature holder 216, the control unit 225, the thermistor 703, and the temperature controller 711.

One example element heating operation (element recovery operation) in accordance with the present embodiment will be explained, wherein the temperature of the temperature holder 216 is raised from the operation temperature of 30° C. to the recovery temperature of 100° C. in 2 minutes after turning ON the main power supply, and is held at 100° C. for 5 minutes, and the temperature of the temperature holder 216 is then lowered back to 30° C. in 2 minutes.

Figure 7:
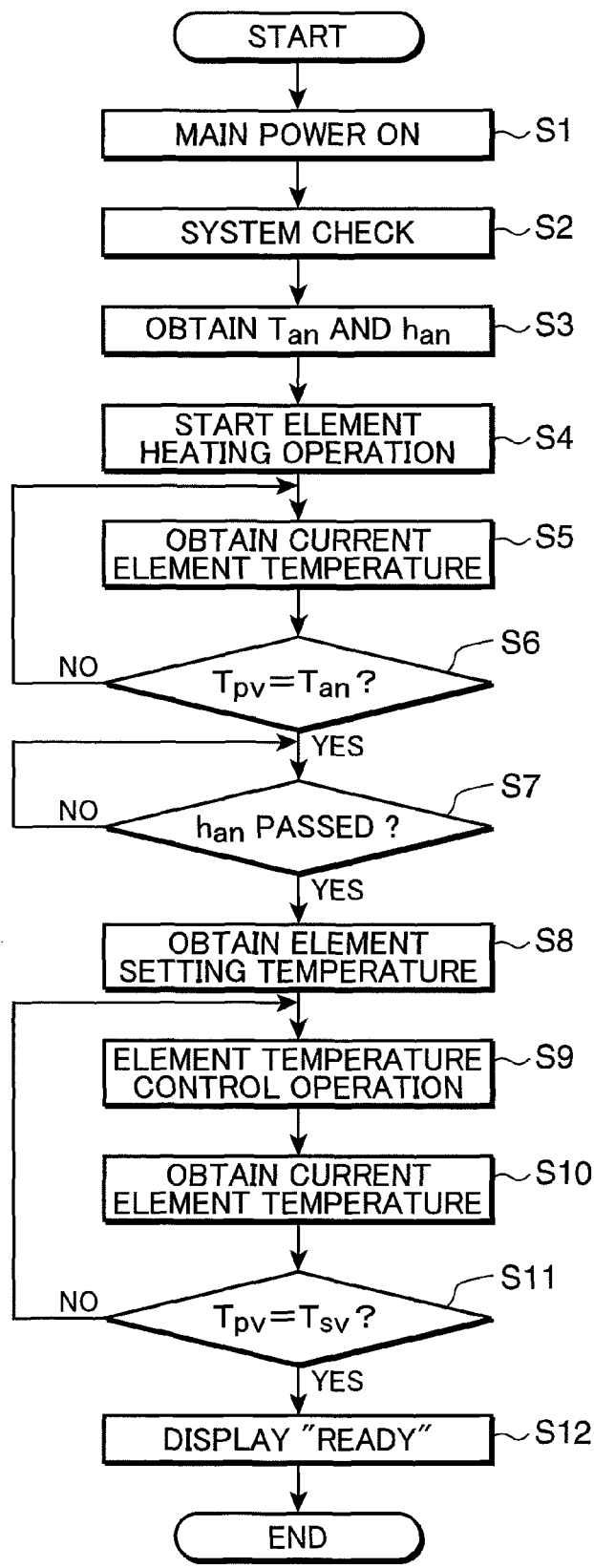
FIG. 7 is a flowchart showing one example of a recovery operation by the refraction index recovery mechanism in accordance with one embodiment of the present invention.

FIG. 7 is a flowchart showing one example of the recovery operation by the refractive index recovery mechanism in accordance with the present embodiment, wherein the recovery operation is performed when turning ON the main power supply of the device.

With this recovery operation, the wavelength conversion element 209 is heated to the recovery temperature set to higher temperature than the operation temperature of the wavelength conversion element 209 in the operation mode, and the wavelength conversion element 209 is held at the recovery temperature for a predetermined time, thereby applying to the thermal energy to the wavelength conversion element 209. With the recovery operation by the refraction index recovery mechanism, electrons (hole) trapped in lattice defects in the non-linear optical crystals of the wavelength conversion element 209 are excited with an applied external energy (thermal energy), to release the electrons from the wavelength conversion element 209, thereby recovering the refractive index of the wavelength conversion element 209.

When turning ON the main power supply (S1), first, a system check is performed to see if any abnormality occurs in the optical apparatus (S2). Upon completing the system check in S2, the recovery temperature $T_{an}$ as set and the holding time $h_{an}$ of the wavelength conversion element 209 are obtained from the EEPROM 706 (S3). In the present embodiment, the recovery temperature $T_{an}$ was set to 100° C., and holding time $h_{an}$ was set to 5 minutes.

Next, based on the recovery temperature $T_{an}$ as set and the holding time $h_{an}$ of the wavelength conversion element 209 obtained in S3, the element heating operation (recovery operation) is started with an applied thermal energy (S4). Then, the current temperature $T_{pv}$ of the wavelength conversion element 209 is obtained (S5), to be compared with the recovery temperature $T_{an}$ as set (S6).

When the current temperature $T_{pv}$ of the wavelength conversion element 209 reaches the recovery temperature $T_{an}$ (100° C.) as set (YES in S6), it is checked if the holding time $h_{an}$ has passed (S7). The wavelength conversion element 209 is held at the recovery temperature $T_{an}$ (100° C.) as set until the holding time $h_{an}$ has passed (YES in S7). Upon completing the heating operation for recovery, the operation temperature $T_{sv}$ as set when carrying out the wavelength conversion is obtained from the EEPROM 706 (S8).

Next, based on the operation temperature $T_{sv}$ as set obtained in S8, the element temperature adjusting operation starts (S9). Then, the current temperature $T_{pv}$ of the wavelength conversion element 209 is obtained (S10), to be compared with the operation temperature $T_{sv}$ as set (S11). When the current temperature $T_{pv}$ of the wavelength conversion element 209 reaches the operation temperature $T_{sv}$ as set (YES in S11), the laser device 600 (FIG. 6) becomes ready to output a laser beam, and the ready display section 608 is lighted (S12).

Upon completing the foregoing routine, the refractive index recovery operation of the element ends.

The described recovery operation is carried out in the non-operation mode in which light is not incident into the wavelength conversion element 209.

The described recovery operation was actually performed with respect to the light conversion element whose phase matching temperature shifted over a predetermined operation time by once turning OFF the main power supply and then turning ON the main power supply using the optical apparatus provided with the refractive index recovery mechanism, which executes the heating operation for the recovery shown in FIG. 7, and changes in phase matching temperature were observed.

Figure 8:
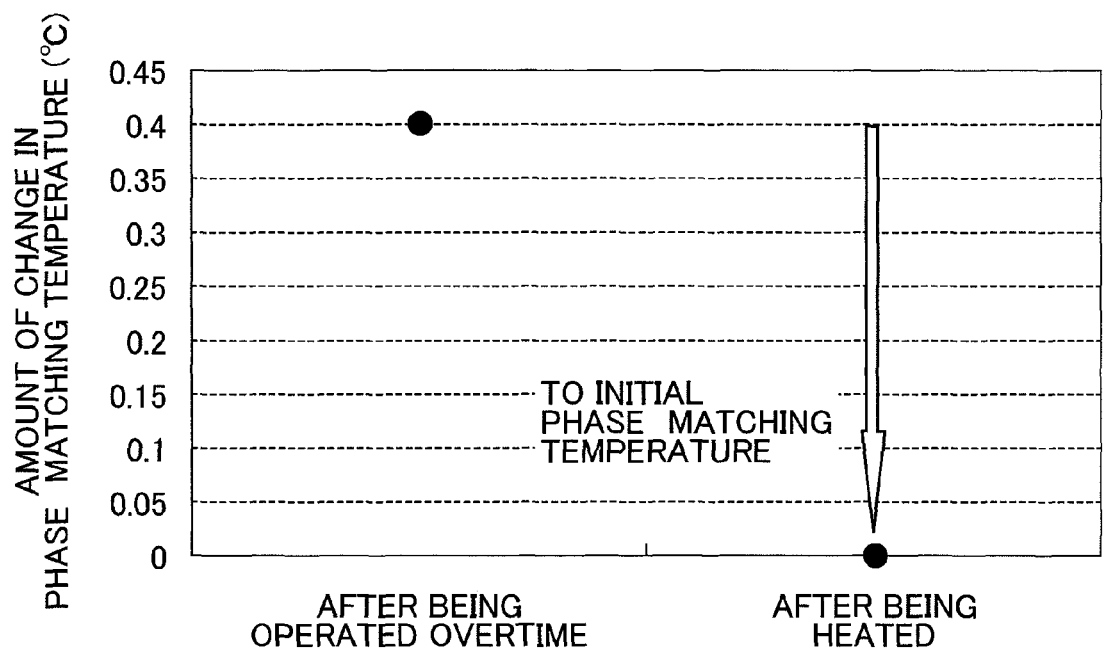
FIG. 8 is a plot diagram showing differences in changes in phase matching temperature between before and after carrying out a recovery operation by the refractive index recovery mechanism in accordance with one embodiment of the present invention.

As a result of carrying out the recovery operation, the phase matching temperature became no longer shifted (change in phase matching temperature=0), and the recovery to the initial phase matching temperature could be confirmed (plot diagram of FIG. 8) after turning on the main power supply.

The heating operation for the recovery in accordance with the present embodiment may be carried out at the timing of turning OFF the power supply of the optical apparatus 200 instead of carrying out at the timing of turning ON the power supply (FIG. 7).

Another example of the heating operation (recovery operation) by the refractive index recovery mechanism in accordance with the present embodiment will be explained with reference to the flowchart of FIG. 9, wherein the recovery operation is performed when turning OFF the main power supply of the device.

Figure 9:
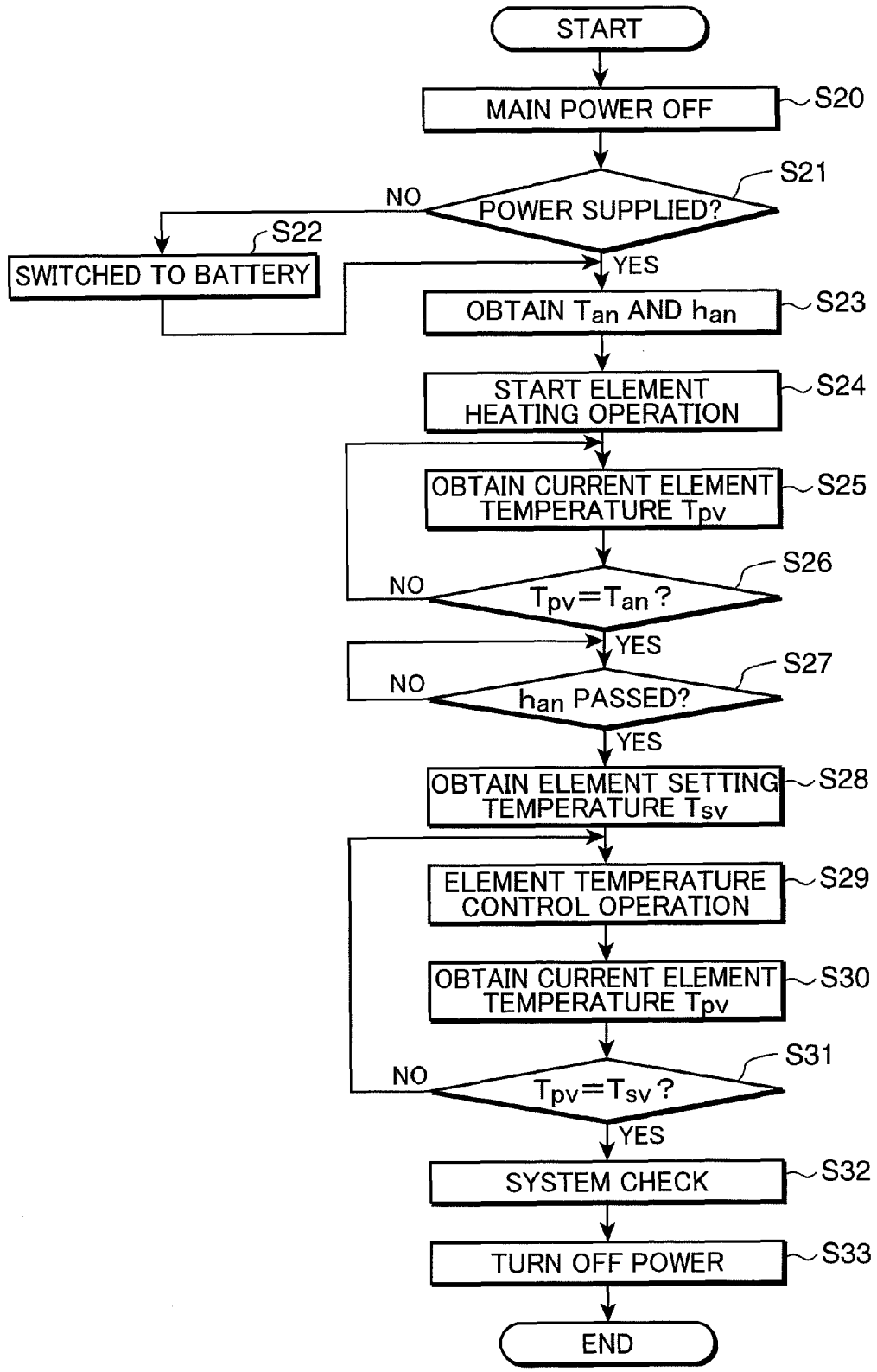
FIG. 9 is a flowchart showing another example of a recovery operation by the refraction index recovery mechanism in accordance with one embodiment of the present invention.

In this example heating operation shown in FIG. 9, the temperature of the temperature holder 216 was raised from the operation temperature of 30° C. to the recovery temperature of 100° C. in 2 minutes, and was held at 100° C. for 5 minutes, and the temperature of the temperature holder 216 was then lowered back to 30° C. in 2 minutes as in the case of FIG. 7.

For the example of FIG. 9, it is preferable that the optical apparatus be provided with the refractive index recovery mechanism which executes the heating operation for recovery, includes a backup battery such as battery (capacitor) 203 as shown in the area surrounded by dotted lines in FIG. 5 so that the power supply can be ensured even when the power supply is plugged off immediately after turning OFF the power supply, and the externally supplied power cannot be obtained.

FIG. 9 is a flowchart showing another example of the recovery operation by the refractive index recovery mechanism in accordance with the present embodiment, wherein the recovery operation is performed when turning OFF the main power supply of the device.

When turning ON the main power supply (S20), it is checked if the power is still being supplied (S21). If the power is not supplied (NO in S21), the power supply for the element's temperature adjusting operation (NO in S21), the power source is switched from the commercial power source to the battery (S22). Then, the recovery temperature $T_{an}$ as set (target heating temperature: 100° C.) and the holding time $h_{an}$ (5 minutes) of the wavelength conversion element 209 are obtained from the EEPROM 706 (S23).

On the other hand, when the power is supplied (YES in S21), it is not necessary to be switched to the battery 203, the sequence goes directly to S23 and the recovery temperature $T_{an}$ as set and the holding time $h_{an}$ of the wavelength conversion element 209 are obtained from the EEPROM 706. In the present embodiment, the recovery temperature $T_{an}$ is set to 100° C., and holding time $h_{an}$ is set to 5 minutes.

Next, based on the recovery temperature $T_{an}$ as set and the holding time $h_{an}$ of the wavelength conversion element 209 obtained in S23, the element heating operation (recovery operation) is started (S24). Then, the current temperature $T_{pv}$ of the wavelength conversion element 209 is obtained (S25), to be compared with the recovery temperature $T_{an}$ as set (S26). When the current temperature $T_{pv}$ of the wavelength conversion element 209 reaches the recovery temperature $T_{an}$ (100° C.) as set (YES in S26), it is checked if the holding time $h_{an}$ has passed (S27). The wavelength conversion element 209 is held at the recovery temperature $T_{an}$ (100° C.) as set until the holding time $h_{an}$ has passed (YES in S27). Upon completing the heating operation for recovery, the operation temperature $T_{sv}$ as set when carrying out the wavelength conversion is obtained from the EEPROM 706 (S28).

Next, based on the operation temperature $T_{sv}$ as set, the element temperature adjusting operation starts being performed (S29). Then, the current temperature $T_{pv}$ of the wavelength conversion element 209 is obtained (S30), to be compared with the operation temperature $T_{sv}$ as set (S21). When the current temperature $T_{pv}$ of the wavelength conversion element 209 reaches the operation temperature $T_{sv}$ as set (YES in S31), the system check of the entire device is performed (S32). Upon completing the foregoing routine, the power supply is shut off (S33).

The described recovery operation of the refractive index was actually performed at the timing of turning OFF the main power supply. As a result, the recovery from the shifted phase matching temperature to the initial phase matching temperature could be confirmed as in the case of carrying out the recovery operation at the timing of turning ON the main power supply.

The heating operation for the recovery in accordance with the present embodiment may be carried out at the timing of turning OFF the power supply of the optical apparatus 200 instead of carrying out at the timing of turning ON the power supply.

As mentioned above, deterioration in the output characteristic caused by shifts in phase matching temperature over time can be prevented by executing the described routine of the heating operation of the wavelength conversion element for the recovery at the timing of turning ON or OFF the main power supply of the optical apparatus.

Incidentally, in the present embodiment shown in FIG. 9, the temperature of wavelength conversion element 209 is cooled to the operating temperature as set after the heating operation for the recovery has been completed in S27 to carry out the system check with respect to the wavelength conversion element 209 set to the operation temperature. However, in the case of not carrying out the system check, the wavelength conversion element 209 may be cooled naturally as it is after completing the heating operation for the recovery.

Incidentally, in the present embodiment shown in FIG. 7 and FIG. 9, the heating operation is always carried out at the timing of operating the power supply (when turning ON in FIG. 7, and when turning OFF in FIG. 9). However, the present invention is not intended to be limited to the foregoing, and it may be arranged, for example, such that the heating operation for recovery is not carried out if an overall operation time has not reached the predetermined time.

As described, by executing the routine of the element heating operation at the timing of operating the main power supply, i.e., before or after operating the apparatus, it is possible to avoid such problem that a light outputted from the apparatus becomes unstable while the apparatus is being used, and to recover the phase matching temperature from the shifted phase matching temperature without a user's conscious.

Second Embodiment

Another embodiment of the present invention will be described with reference to figures.

The wavelength conversion laser light source (optical apparatus) in accordance with the present embodiment is provided with the refractive index recovery mechanism for recovering a shifted refraction index of non-linear optical crystals which can be the cause of shifting in phase matching temperature over time, to a refractive index in an initial state. Other than the refractive index recovery mechanism, the wavelength conversion laser light source of the present embodiment has the same structure as that of the first embodiment, and therefore for members having the same structures and functions as those of the first embodiment will be designated by the same reference numerals and descriptions thereof shall be omitted here.

In the present embodiment, the method of recovering the wavelength conversion element 209 which has deteriorated over time by heating the wavelength conversion element 209 to a predetermined recovery temperature and holding it for a predetermined temperature in a similar manner to the first embodiment.

The wavelength conversion laser light source (optical apparatus) of the present embodiment is provided with a detecting section (control unit 225, photo-detector 212) for detecting changes in refractive index (shifts in phase adjustment temperature) of wavelength conversion element 209. The refractive index recovery mechanism raises the temperature of the wavelength conversion element 209 at the timing of detecting shifts in phase matching temperature, and holds the wavelength conversion element 209 at that recovery temperature for a predetermined time. After an elapse of the predetermined time, the refractive index recovery mechanism cools the wavelength conversion element 209 back to the operation temperature.

In the first embodiment, the heating operation for recovery is carried out at the timing of operating the main power supply. The present embodiment differs from the heating operation for recovery of the first embodiment in that the heating operation of the wavelength conversion element 209 is carried out at the timing of detecting that shifts in phase matching temperature reach the predetermined level after the emission of the laser beam has been completed.

Namely, the refractive index recovery mechanism in accordance with the present embodiment differs from the first embodiment in the timing of carrying out the heating operation for recovery.

In the present embodiment, the heating operation for recovery may be carried out immediately after detecting that shifts in phase matching temperature have reached the predetermined level. It may be also arranged such that even after detecting that changes in phase matching temperature have reached the predetermined level, the light conversion process continues being carried out until the current operation has been completed, and the heating operation for recovery is executed after the current operation has been terminated.

First, the method of detecting shifts in phase matching temperature will be explained.

Experiments were performed with the constant input fundamental wave or the constant input current to the fundamental wave light source, with respect to the wavelength conversion element in the initial stage and the wavelength conversion element which has been operated for 200 hours (overall operation time), to check the relationship between the temperature of the wavelength conversion element and the harmonic wave (green light) output. The results of experiment are shown in FIG. 10.

Figure 10:
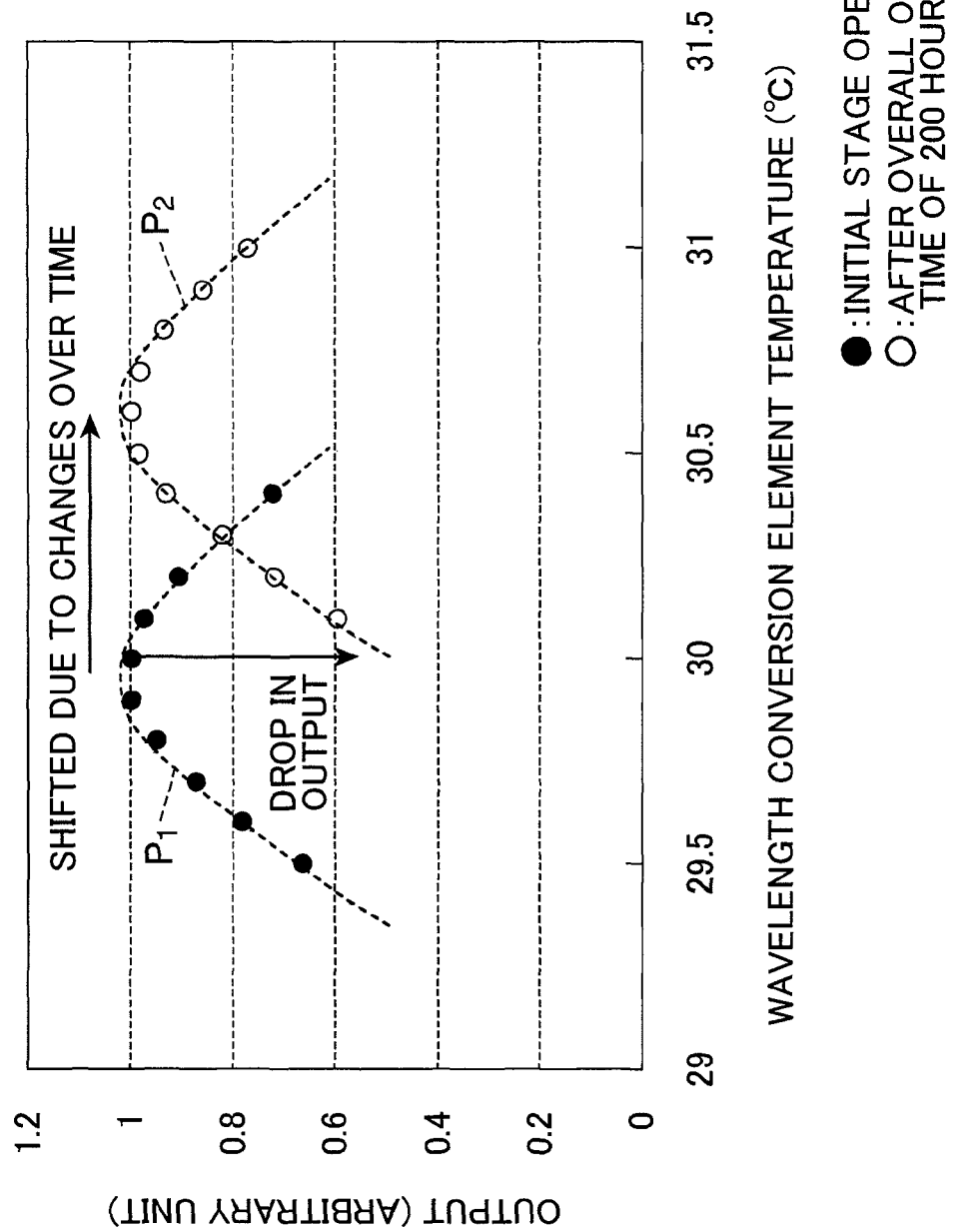
FIG. 10 shows a temperature-tuning curve showing the relationship between the wavelength conversion element temperature and the harmonic wave output.

In the graph of FIG. 10, P1 is a tuning curve when carrying out the operation in the initial stage, and P2 is a tuning curve when carrying out the operation after the overall operation time of 200 hours. As shown in the graph of FIG. 10, the phase matching temperature was shifted from 30° C. (initial stage) to 30.6° C. (after an overall operation time reaches 200 hours), and the phase matching temperature was shifted to the higher temperature side by 0.6° C. It is also understood that when the wavelength conversion element 209, which has been operated for 200 hours (overall operation time), at the temperature of 30° C. without adjusting to the shifted phase matching temperature, the harmonic wave (green light) output was dropped to around 60% of the harmonic wave output in the initial stage.

As described, under the control of the constant fundamental wave input or the constant input current, the harmonic wave output drops over time due to shifts in phase matching temperature. In view of the foregoing, it may be arranged, for example, to monitor the harmonic wave output all the time by the photo detector under the condition of the constant fundamental wave input or the constant input current to the fundamental wave light source, the element heating operation is started at the timing of detecting that the harmonic wave output has dropped by a predetermined ratio from the initial level.

On the other hand, when adopting the control with the constant harmonic wave output, it is necessary to increase the input fundamental wave or the input current. Therefore, when adopting the control with the constant harmonic wave output, it may be arranged so as to detect an increase in input fundamental wave or an input current from the initial level, and the heating operation of the wavelength conversion element is carried out at the timing of detecting the increase.

Figure 11:
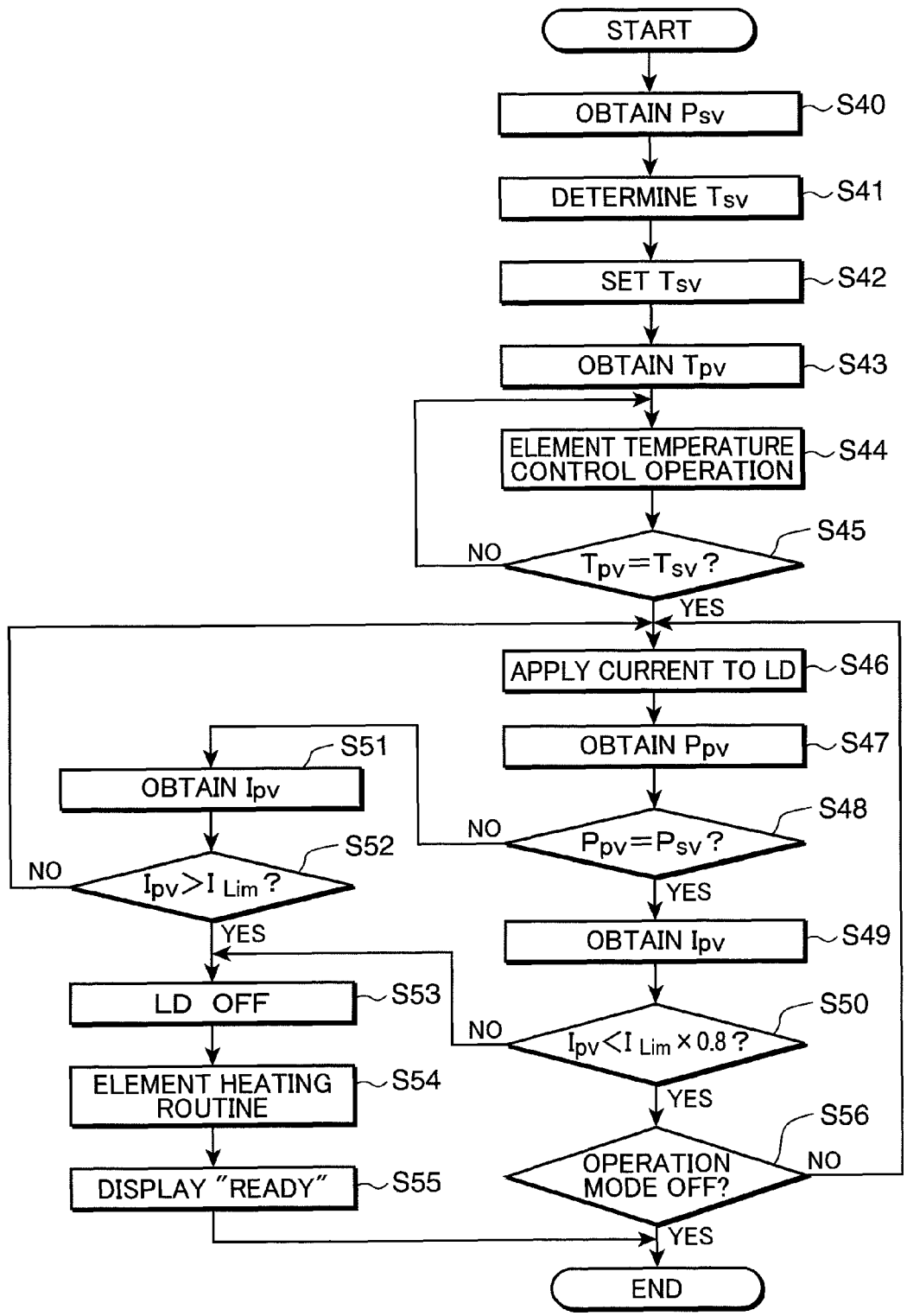
FIG. 11 is a flowchart showing one example of a recovery operation by the refractive index recovery mechanism in accordance with another embodiment of the present invention.

FIG. 11 is a flowchart showing an example of the recovery operation for recovering the refractive index of the non-linear optical crystals in the wavelength conversion element 209 by the refractive index recovery mechanism in accordance with the present embodiment. First, the after operating the wavelength conversion laser light source (optical apparatus) 200, the harmonic wave output $P_{sv}$ as set is obtained from the output setting device 201 (S40).

Next, based on the harmonic wave output $P_{sv}$ as set and obtained in S40, the operation temperature $T_{sv}$ is determined refereeing to the output-temperature conversion table stored in the EEPROM 706 (S41), and the operation temperature $T_{sv}$ thus determined is set (S42). Then, the current temperature $T_{pv}$ of the wavelength conversion element 209 is obtained from the thermistor 703 (S43), and the temperature adjusting operation is started (S44). Next, it is checked if the current temperature $T_{pv}$ of the wavelength conversion element 209 has reached the operation temperature as set $T_{sv}$ by the thermistor (temperature detector) 703 (S45). If the current temperature $T_{pv}$ of the wavelength conversion element 209 has reached the operation temperature $T_{sv}$ (YES in S45), the current starts being applied to the LD (S46).

Next, the current harmonic wave output $P_{pv}$ is obtained (S47), and it is checked if the current harmonic wave output $P_{pv}$ has reached the output value as set $P_{sv}$ (S48). If the current harmonic wave output $P_{pv}$ has reached the output value as set $P_{sv}$ (YES in S48), the present current value $I_{pv}$ is obtained (S49). Then, it is checked if the present current value $I_{pv}$ has reached 80% of the limit value $I_{Lim}$ (S50). If the present current value $I_{pv}$ has not reached 80% of the limit value $I_{Lim}$ (YES in S50), the operation mode is continued (the sequence goes back to S46, and the loop process continues) until the operation mode is set OFF in S56. In the loop process, when the operation mode is set OFF (YES in S56), the process is terminated.

On the other hand, if the current harmonic wave output $P_{pv}$ has reached the output value as set $P_{sv}$ (NO in S48), the present current value $I_{pv}$ is obtained (S51). If the present current value $I_{pv}$ has not reached the limit value $I_{Lim}$ (NO in S52), the sequence goes back to S46, and a cullet to be supplied to the LD is increased. Thereafter, the routine in S46 to S48, S51 and S52 is repeated until the current harmonic wave output $P_{pv}$ reaches the output value $P_{sv}$ as set.

In the foregoing loop process, if the present current value $I_{pv}$ has reached the limit value $I_{Lim}$ before the current harmonic wave output $P_{pv}$ reaches the output value as set $P_{sv}$ (YES in S52), it is switched to the LD standby mode (S53), and the routine of heating the element is executed to carry out the recovery operation for recovering the refractive index of the non-linear optical crystal (S54). Upon completing the routine of heating the element, a sign "Ready" is displayed in the ready display section 608 (FIG. 6) (S55).

Similarly, in the foregoing loop process, if the present current value $I_{pv}$ has reached 80% of the limit value $I_{Lim}$ (NO in S50), the LD is switched to the standby mode (S53), and the routine of heating the element is executed (S54). Upon completing the routine of heating the element, a sign "Ready" is displayed in the ready display section 608 (S55).

Figure 12:
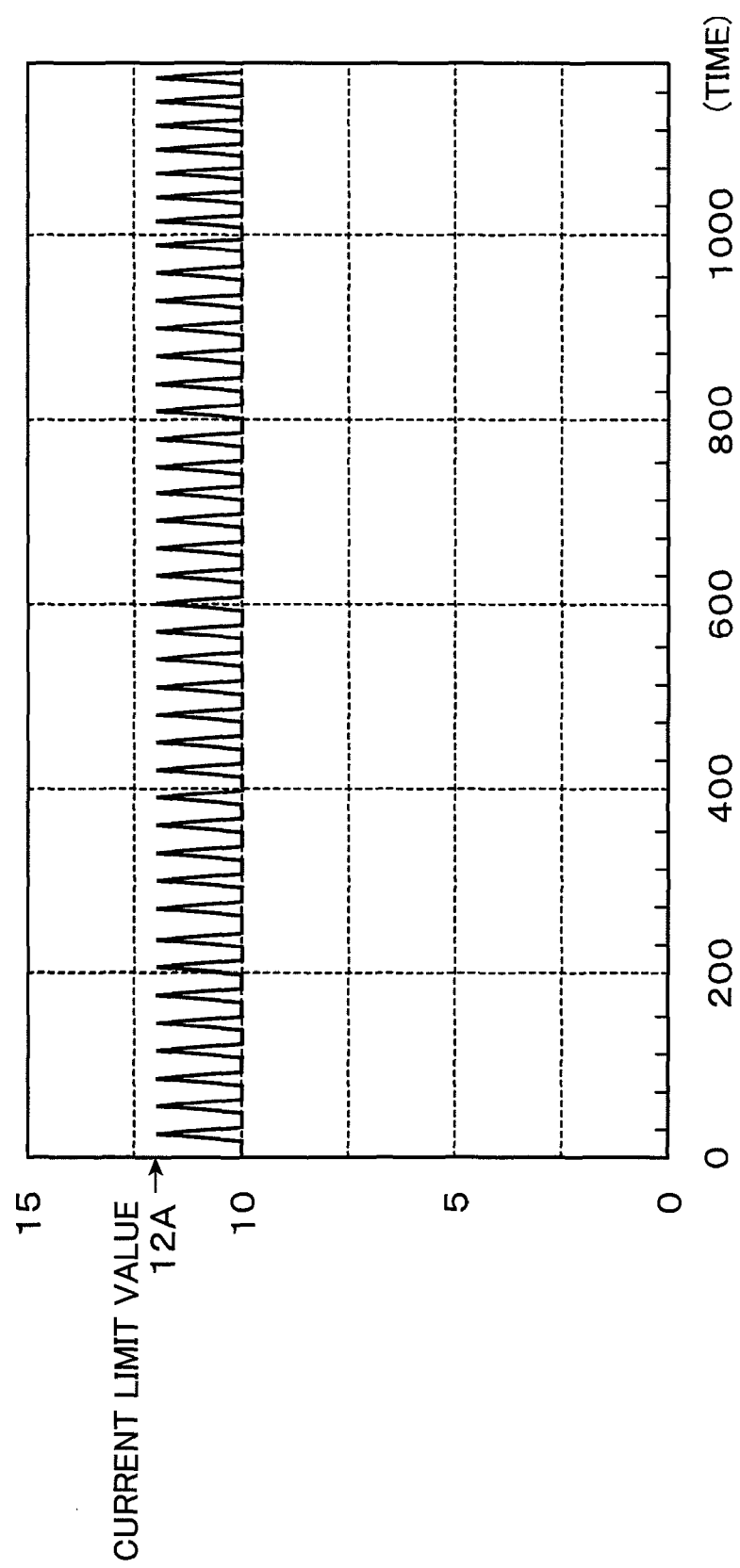
FIG. 12 is a graph which shows changes in LD current with respect to overall operation time when executing the recovery operation shown in FIG. 11.

According to the described control of the present embodiment, upon detecting a change in refractive index of the non-linear optical crystal based on changes in current supplied to the LD, the recovery operation is executed by the element heating routine (S54). As a result, although the required current increases temporarily, the required current can be reduced back to the initial level as shown in FIG. 12. With this control, it is therefore possible to obtain the output under stable conditions even when operating over a long period of time (overall operation time), while realizing stable output control without using margin for other control.

As described, changes in refractive index of the non-linear optical crystals can be detected based on changes in phase matching conditions of the non-linear optical crystal of the wavelength conversion element 209 in the operation mode. In the present embodiment, shifts in phase matching temperature are detected to detect changes in refractive index of the wavelength conversion element 209. However, the present embodiment is not intended to be limited to this method, and it may be arranged, for example, to detect changes in refractive index based on changes in phase matching wavelength, or other factor of phase matching conditions.

REFERENCE EXAMPLE

The following descriptions will explain the case wherein the phase matching temperature of the wavelength conversion element in the operation mode is set to 80° C. In this reference example, the recovery operation for recovering the refractive index of the non-linear optical crystal performed in first and second embodiments are not carried out.

Figure 14:
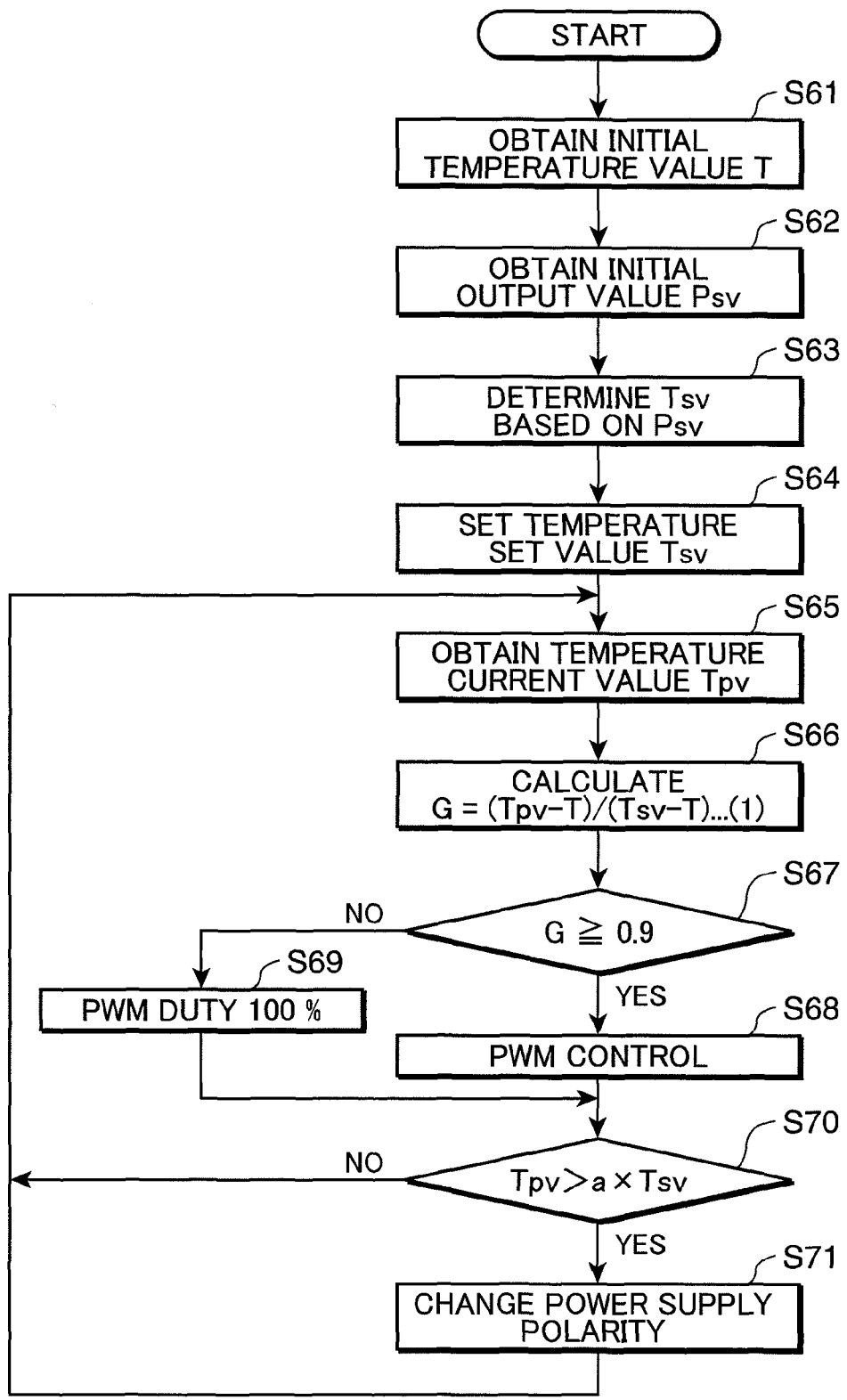
FIG. 14 is a flowchart showing a control operation of a wavelength conversion element by a temperature controller in accordance with a reference example of the present invention.

FIG. 14 is a flowchart showing processes of controlling a wavelength conversion element in an operation mode by a temperature controller in accordance with the reference example.

When the operation of the wavelength conversion laser light source is started, first the temperature initial value T of the temperature holder 216 for the wavelength conversion element is obtained (S61). Then, the output power $P_{sv}$ as set in the output setting device 201 is obtained from the control unit 225 (S62). Based on the output power $P_{sv}$, the operation temperature $T_{sv}$ is obtained from the EEPROM 706 (S63), to be set as the target element temperature (S64). Before starting the temperature control, the temperature present value $T_{pv}$ of the wavelength conversion element 209 is obtained from the thermistor 703 (S65). Then, the polarity of current to be applied to the temperature holder 216 (in the case of adopting the Peltier device as the temperature holder 216) and the waveform are subjected to control.

Then, a coefficient G is computed for use in controlling the current waveform based on the temperature initial value T, the temperature set value $T_{sv}$ and the temperature present value Tpv (S66).

$$G = (T_{pv} - T)/(T_{sv} - T) \quad (1)$$

In the present embodiment, the duty ratio is switched based on the coefficient G thus computed in S66 to control the current waveform.

When the condition of $0.9 \leqq G$ is satisfied (YES in S67), the PWM control is performed (S68). On the other hand, when the condition of $0.9 \leqq G$ is not satisfied (NO in S67), the duty ratio is set to 100%, and the PWM control is not performed (S69).

In replace of the foregoing structure of switching the duty ratio based on the coefficient G, it may be arranged so as to directly use the computed value from the equation of the current duty ratio for controlling temperature=b*(1−G)/(b+G) using the coefficient G and the coefficient b ($0 < b \leqq 1$).

Next, it is then determined if a change in current polarity is required by the following inequality (2) using $T_{pv}$, $T_{sv}$ and a coefficient α (S70).

$$T_{pv} > a \times T_{sv} \quad (2)$$

When the above inequality (2) holds (YES in S70), the polarity of current is changed (S71). On the other hand, when the condition of $0.9 \leqq G$ is not satisfied (NO in S67), it is determined if the above inequality (2) holds without performing the PWM control in S68 (S70).

The coefficient α in the inequality (2) is adopted for preventing the polarity of the current to be switched to the normal state frequently. It is preferable that the coefficient a falls in a range of from 1.1 to 1.2.

Incidentally, when Tpv is in a range of $1.1 \times T_{sv}$ to $1.2 \times T_{sv}$, the current may be cut to reduce the temperature of the wavelength conversion element 209 by natural cooling.

After the polarity of current changes in S71, the sequence goes back to S65 where the current temperature value of the wavelength conversion element 209 is obtained (S65). By repeating the foregoing processes, a green light can be outputted under stable condition.

Here, the coefficient α is set to the function of the harmonic wave output, and by setting such that the duty ratio becomes smaller as the harmonic wave output increases, it is possible suppress the non-uniform temperatures of the wavelength conversion element resulting from the wavelength conversion element which absorbs the harmonic wave output.

According to the control flow of FIG. 14, the polarity of the Peltier device is reversed when the temperature greatly exceeds the preset temperature value, and operation that cools the temperature holding section is performed. In this reference example, since the element temperature is set to 80° C., it may be arranged so as to temporarily stop the supply of the current to the Peltier device in replace of reversing the polarity.

Figure 15:
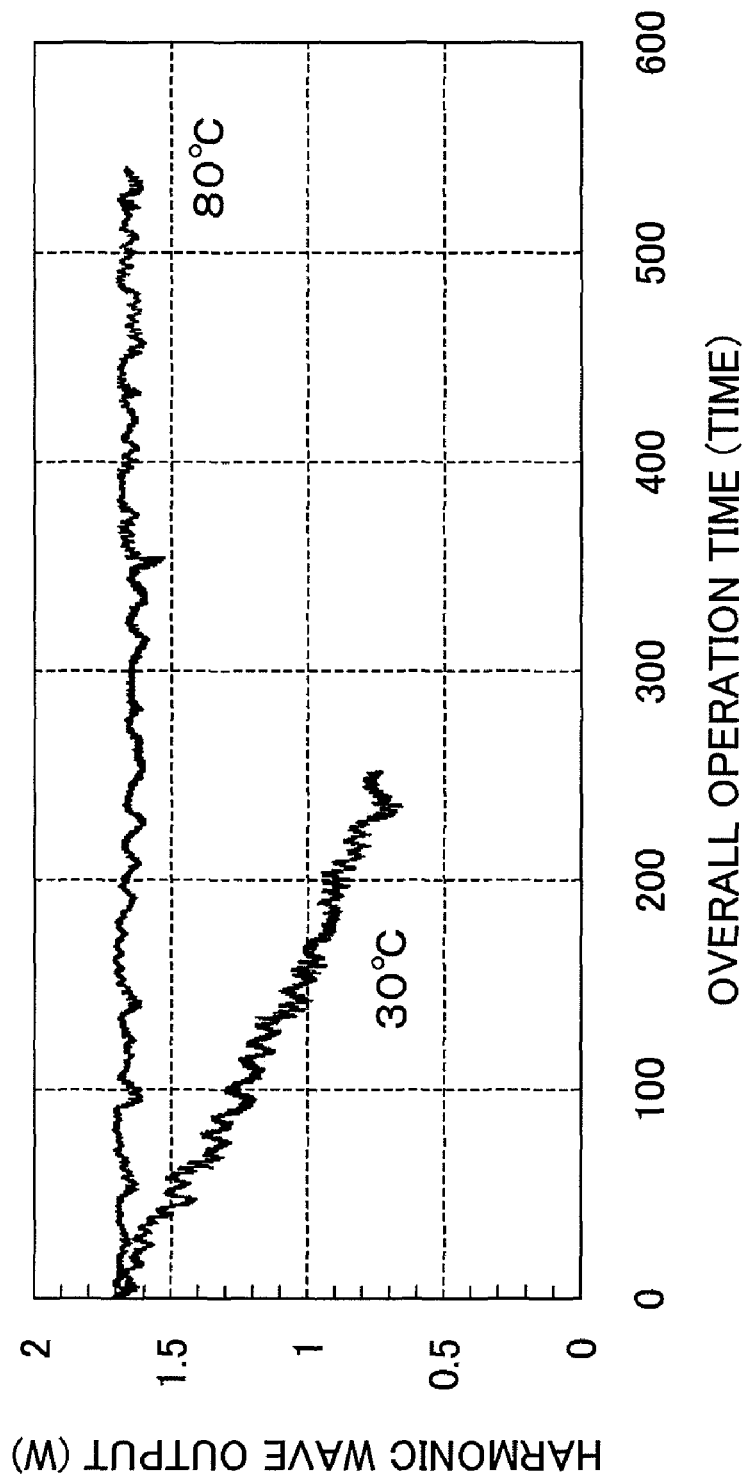
FIG. 15 is a graph showing the relationship between an overall operation time and a harmonic wave output with a parameter of the holding temperature of the wavelength conversion element in accordance with another embodiment of the present invention.

FIG. 15 is a plot diagram of the harmonic wave output with respect to the overall operation time under the control of the constant current. As can be seen from the graph of FIG. 15, in the case where the operation temperature was set to 30° C., the harmonic wave output was reduced gradually over time (as the overall operation time becomes longer). However, in the case where the operation temperature was set to 80° C., as in the case of the reference example, it was confirmed that the initial level of the harmonic wave output was maintained even when the overall operation time had reached 500 hours. As described, by setting the operation temperature of the wavelength conversion element (non-linear optical crystals) in the operation mode to a temperature above a certain temperature, the refractive index of the non-linear optical crystal would not change over time by the light incident in the non-linear optical crystal in the operation mode, and therefore the problem to be solved by the present invention, i.e., changes in refractive index over time of the non-linear optical crystal.

Incidentally, Japanese Patent No. 3412906 adopts the method of adjusting the phase matching condition using the birefringence of the material without using the polarization reversing structure, and the wavelength conversion element is used in the state where the phase matching temperature when the fundamental wave is inputted at an angle parallel to the dielectric major axis of the material becomes 150° C. or above. Consequently, the describe problem associated with changes in phase matching temperature over time have not been found.

Third Embodiment

The following descriptions will explain another embodiment of the present invention with reference to figures.

In the present embodiment, how the length of the wavelength conversion crystal of the wavelength conversion element 209 of the wavelength converted laser light source affects the effect of the refractive index recovery by the refractive index recovery mechanism will be explained.

Figure 16:
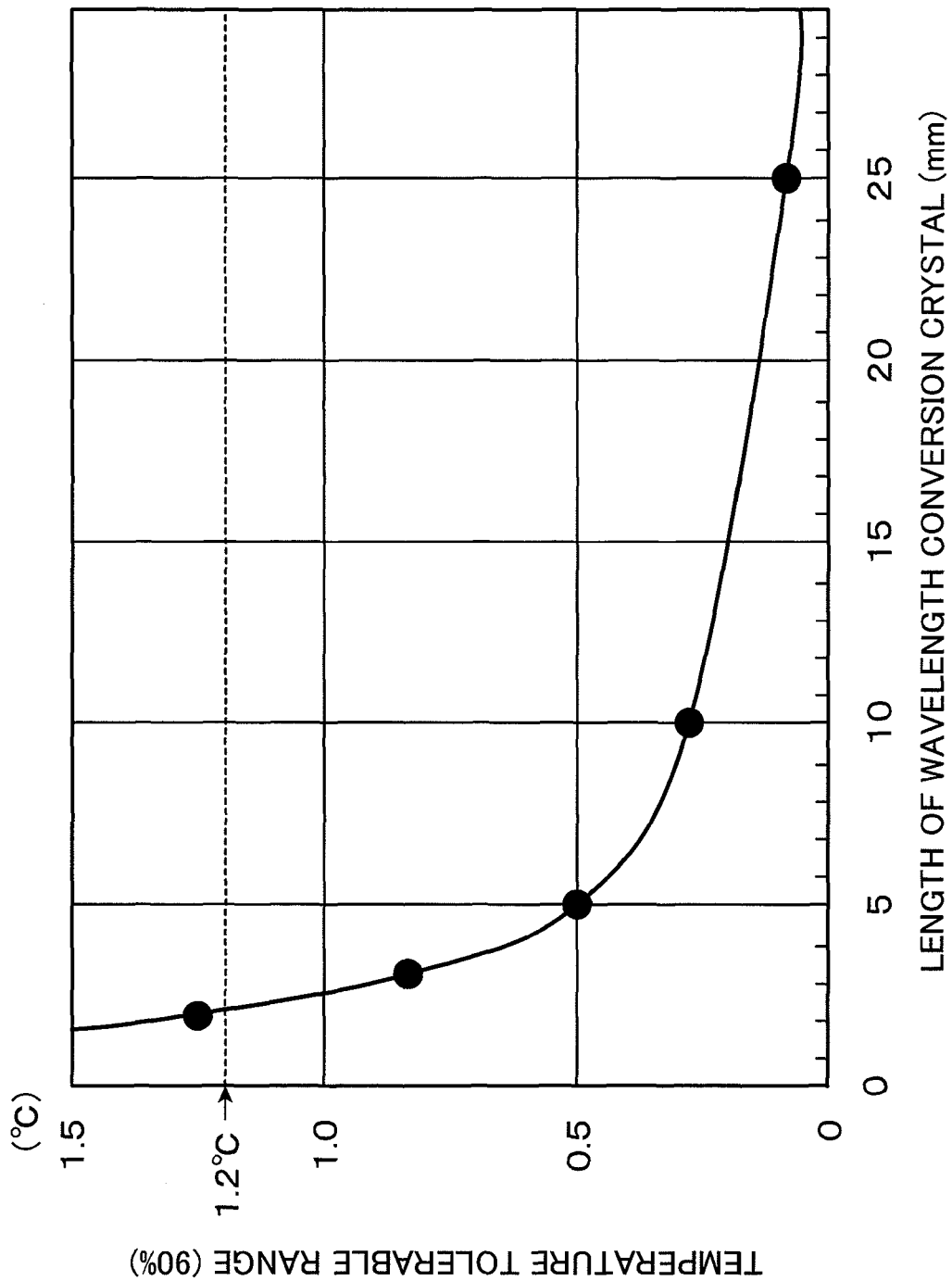
FIG. 16 is a graph showing the relationship between the length of the wavelength conversion liquid crystal and the tolerance range for temperature.

FIG. 16 is the relationship between the temperature range (tolerable range of 90%) in which the output is reduced up to 90% of the initial level (100%), and the length of the wavelength conversion crystal (interaction length in the area subjected to actual wavelength conversion) in the case where the spectrum width of the fundamental wave is set to around 0.1 nm.

For example, with the wavelength conversion crystal with the length of 5 mm, in order to ensure the output level of not less than 90% of the initial output level, changes in phase matching temperature need to be suppressed within the range of ±0.25° C.

The change in the phase matching temperature due to changes in refractive index over time is saturated with at around 1.2° C. Therefore, the effect of recovery can be achieved for the wavelength conversion laser light source adopting the wavelength conversion crystal having the operation length of at least not less than 2 mm.

Figure 17A:
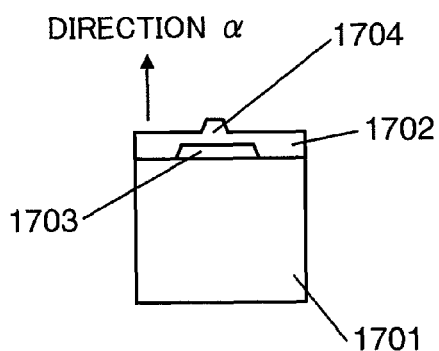
FIG. 17A and FIG. 17B are explanatory views schematically showing example structures of the waveguide type wavelength converter.
Figure 17B:
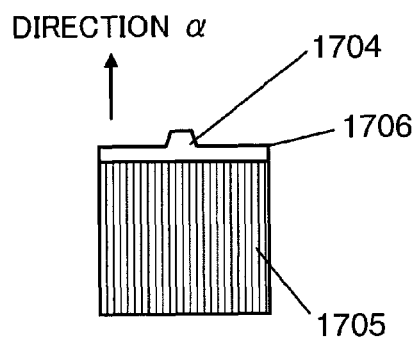

Even when adopting the wavelength conversion crystal with long interaction length, the recovery effect can be achieved, and the wavelength conversion crystal of the waveguide type may be adopted. FIG. 17A and FIG. 17B are cross-sectional views of the wavelength conversion crystal of the wave guide type in the light propagation direction.

FIG. 17A shows the structure so-called "airgap type", wherein using a difference in the refractive index between the waveguide material (material in waveguide section 1704) and air, the light is confined in a direction vertical to the substrate (direction α). Specifically, a waveguide layer 1702 with a cavity 1703 is connected onto a substrate 1701, the wavelength guide was grinded until the thickness of the waveguide layer becomes in a range of 5 to 10 μm to form the waveguide path section 1704. For the structure of FIG. 17A, the light is confined in the direction vertical to the substrate using the difference in refractive index between the waveguide path material and air, the same material may be adopted for the substrate 1701 and the wave guide path section 1704. On the other hand, for the structure of FIG. 17B, the light is confined in the direction vertical to the substrate using the difference in refractive index between the material of the waveguide path (waveguide path section 1706) and the material of the substrate 1805. Therefore, different materials need to be adopted for the substrate 1701 and the waveguide path section 1704, and the following condition needs to be satisfied: the refractive index of the substrate 1705<the refractive index of the waveguide path section 1704.

Incidentally, in the first and second embodiments, explanations have been given through the case of adopting the refractive index recovery mechanism which applies thermal energy to the wavelength conversion element (non-linear optical crystal) as the external energy to recover the refractive index of the non-linear optical crystal. However, the present invention is not intended to be limited to this, and the refractive index recovery mechanism which applies ultraviolet ray or an electric field to the wavelength conversion element may be adopted.

Figure 17C:
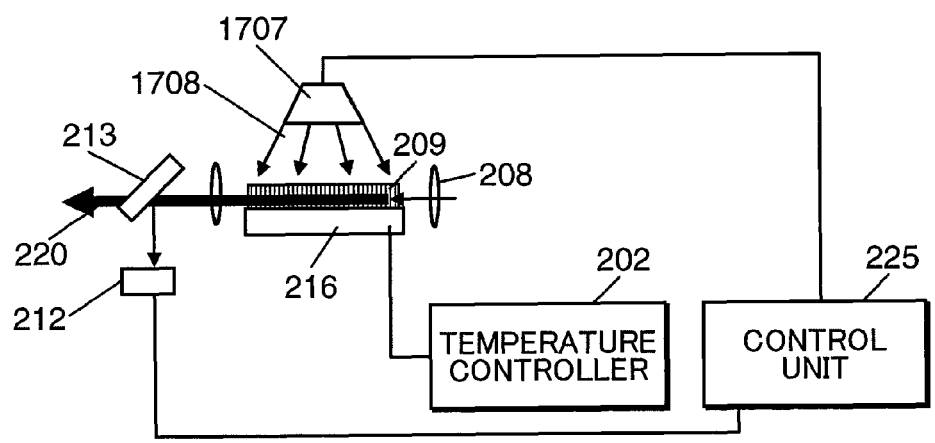
FIG. 17C is a typical depiction showing the structure of recovering the phase matching temperature with an applied of ultraviolet ray.

FIG. 17C shows the schematic structure of the refractive index recovery mechanism for recovering the phase matching temperature with an applied ultraviolet ray to the wavelength conversion element 209. The refractive index recovery mechanism of FIG. 17C is provided with an ultraviolet ray light source (ultraviolet ray emission section) which generates an ultraviolet ray having a wavelength in a range of from 280 nm to 380 nm, and with an output power of not less than 100 mW. With this refractive index recovery mechanism, it was confirmed that with an applied ultraviolet ray as emitted from the ultraviolet ray light source onto the wavelength conversion element 209 for not less than 5 minute, the phase matching temperature was recovered.

Namely, with the recovery operation by the foregoing refractive index recovery mechanism, electrons (hole) trapped in lattice defects in the non-linear optical crystals of the non-linear optical crystal are excited with an applied external energy (thermal energy), to release the electrons from the non-linear optical crystal, thereby recovering the refractive index of the non-linear optical crystal.

Figure 17D:
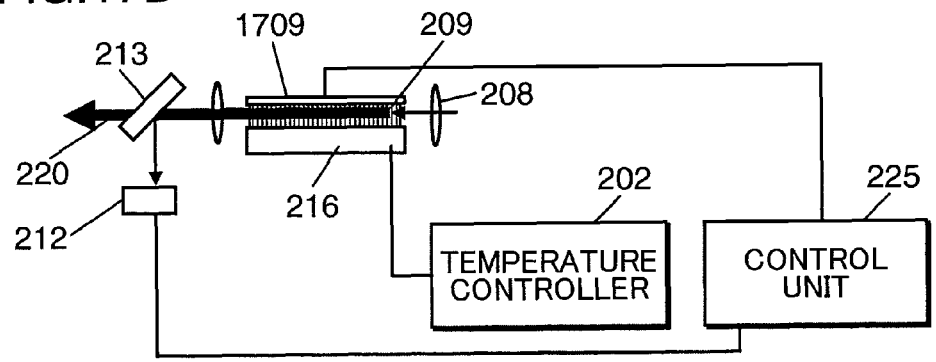
FIG. 17D is an explanatory view schematically showing the structure for recovering from shifted phase patching temperature with an applied electric field.

FIG. 17D shows the schematic structure of the refractive index recovery mechanism for recovering the phase matching temperature with an applied electric field to the wavelength conversion element 209.

The refractive index recovery mechanism of FIG. 17D applies electric field energy to the wavelength conversion element 209 as an external energy to recover the refractive index of the wavelength conversion element 209. Specifically, with this refractive index recovery mechanism, it was confirmed that when the electric field, which is generated with an applied rectangular wave voltage of not less than 500 V, the frequency of not less than 10 Hz, and the duty ratio of not less than 50% to the electrode 1709, is applied to the wavelength conversion element 209 via the electrode 1709 for 10 seconds or longer, the phase matching temperature was recovered.

Namely, with the recovery operation by the foregoing refractive index recovery mechanism, electrons (hole) trapped in lattice defects in the non-linear optical crystals of the non-linear optical crystal are excited with an applied external energy (thermal energy), to release the electrons from the non-linear optical crystal, thereby recovering the refractive index of the non-linear optical crystal.

Incidentally, with the structure wherein an applied electrode is in direct contact with a wavelength conversion crystal, light transmittance will be dropped over time due to electric defects in the $LiNbO_3$. It is therefore preferable that an insulating material with a resistivity of $1 \times 10^8$ Ω·cm) be formed between an applied electrode and a wavelength conversion crystal.

As described, it is possible to recover the phase matching temperature with an applied ultraviolet ray, or an electric field.

Fourth Embodiment

Figure 18:
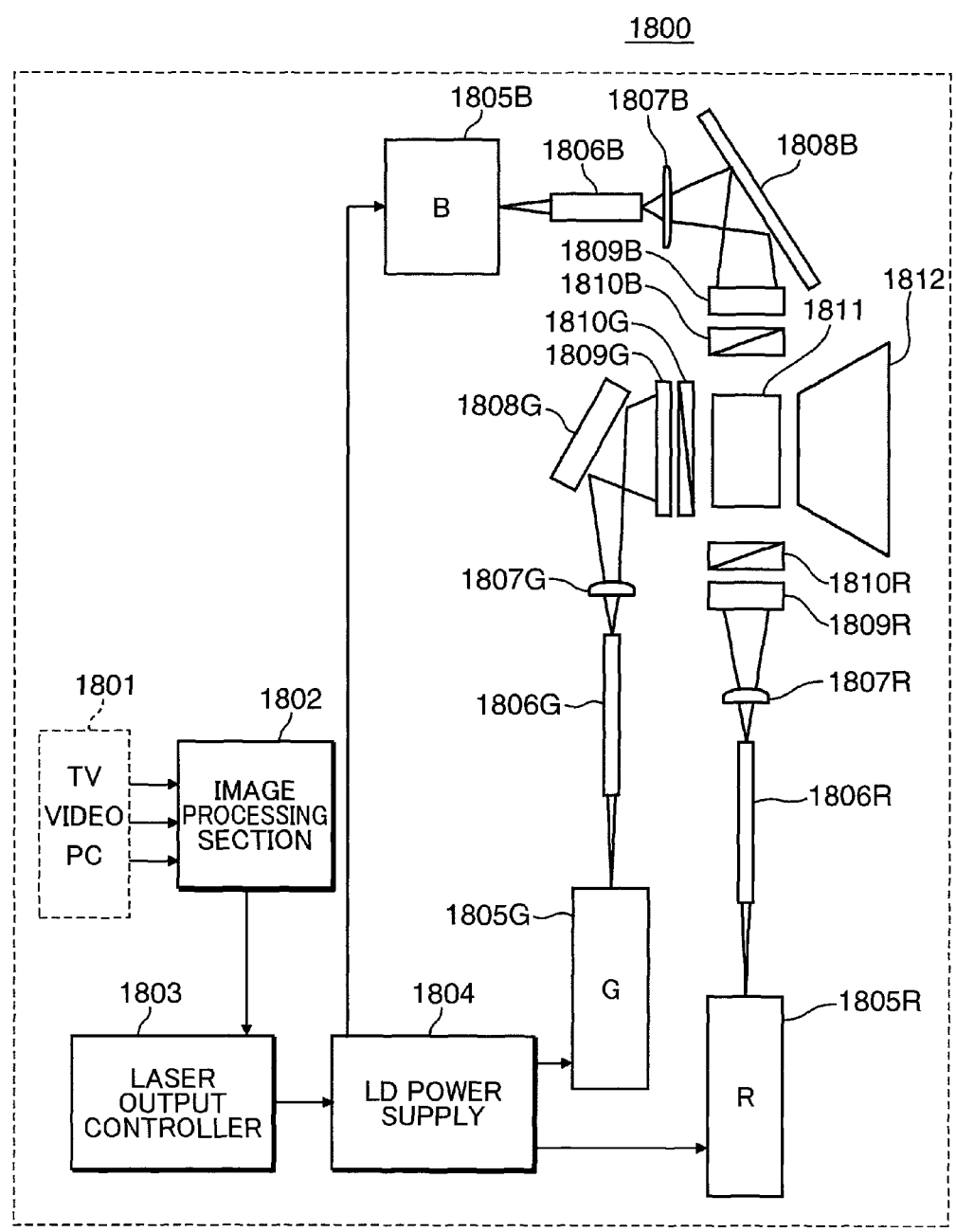
FIG. 18 is an explanatory view schematically showing the structure of a projector (projection display) adopting a laser light source in accordance with still another embodiment of the present invention.

The following descriptions will explain another embodiment of the present invention with reference to FIG. 18 through FIG. 20.

FIG. 18 shows one example structure of a laser display (image display apparatus) adopting a wavelength conversion laser light source in accordance with the present embodiment as one example structure of the two-dimensional image display apparatus adopting the wave length conversion laser light source in accordance with each of the foregoing embodiments of the present invention.

One example structure of a laser display (image display apparatus) applied to the wavelength conversion module of the present embodiment will be explained in reference to FIG. 18.

The two-dimensional image display apparatus 1800 of FIG. 18 adopts the wavelength conversion laser light source of the first and second embodiment applied to an optical engine of a projector system using 3 LCD panels. The two-dimensional image display device 1800 includes an image processing section 1802, a laser output controller (controller) 1803, an LD power supply 1804, red, green and blue laser light sources 1805R, 1805G, and 1805B, beam shape rod lens 1806R, 1806G, and 1806B, relay lens 1807R, 1807G and 1807B, reflecting mirrors 1808G and 1808B, two-dimensional modulation elements 1809R, 1809G and 1809B for displaying an image; polarizers 1810R, 1810G and 1810B, a combine prism 1811, and a projection lens 1812.

The green laser light source 1805G is controlled by the controller 1803 and the LD power supply 1804 which control an output from the green light source.

A laser beam emitted from each of the red, green and blue laser light sources 1805R, 1805G, and 1805B are formed in a rectangular shape by the beam shape rod lens 1806R, 1806G, and 1806B, and with which, the two-dimensional modulation element in each color is illuminated by the relay lens 1807R, 1807G, and 1807B. Further, two-dimensionally modulated images in respective colors are combined by the combine prism 1811, and the resulting image is projected onto the screen by the projection lens 1812, thereby displaying an image.

The green laser light source 1805G is arranged such that a laser resonator is housed in the fiber. With this structure, it is possible to suppress a reduction in output level and fluctuations in output power as time passes due to an increase in loss in the resonator by dust particles from the outside or a misalignment of the reflective surface.

The image processing section 1802 generates a light amount control signal for changing the output level of the laser beam according to the luminance information of the input image signal 1801, and transmits the light amount control signal to the laser output controller 1803. According to the foregoing image processing section 1802, a contrast can be improved by controlling the light amount according to the luminance information. In this case, the control method (PWM control) may be adopted, wherein an average light amount is changed by pulse driving the laser beam to change the duty ratio (ON time)/(ON time+OFF time) for the ON time of the laser.

The green light source adopted in this projection system may be arranged so as to emit a Green laser beam having a wavelength in a range of from 510 nm to 550 nm. With this structure, it is possible to obtain an output laser beam in Green color of high spectral luminous efficiency, thereby realizing a display with a desirable color reproducibility, which can display an image in color close to an original color.

Specifically, the two-dimensional image display device in accordance with the present embodiment includes a screen, a plurality of laser light sources, a scanning section for scanning the laser light sources, wherein the laser light sources include at least laser sources which emit a red color laser beam, a green color laser beam, and a blue color laser beam; and at least the green color light source is provided with the wavelength conversion element having any of the foregoing structures.

With the foregoing structure, an output laser beam in Green color of high luminous factor can be obtained. It is therefore possible to realize a color still closer to the original color with an application to a display with a desirable color reproducibility.

For the two-dimensional image display device, those of a rear projection display type, or of a front projection type may be adopted.

For the special modulation element, it is needless to mention that a two-dimensional modulation element of the transmission type liquid crystal or the reflective type liquid crystal, a galvanometer mirror, a DMD or other Micro Electro Mechanical System (MEMS) may be used.

When adopting the light modulation element which is less likely to be affected by polarization components with respect to the light modulation characteristics, such as the reflection-type special modulation element, the MEMS, the galvanometer mirror like the case of the present embodiment, it is not required to adopt a polarization-maintaining optical fiber such as a PANDA (polarization maintaining and absorption reducing) fiber for transmitting the harmonic wave with the optical fiber. On the other hand, when adopting a two-dimensional modulation device using liquid crystals, the modulation property and the polarization property are significantly affected. It is therefore desirable to adopt a polarization-maintaining optical fiber.

FIG. 19A and FIG. 19B schematically show one example structure of an image display section adopting a backlight illumination device including the Green light source of the first through third embodiment. A schematic structure of the liquid crystal display device 1900 is shown as one example of the image display apparatus.

The backlight illumination device includes a light source unit 1901 provided with a laser light source 1902 and a control unit 1903; a light guide member 1904 for converting the laser light source from a point light source to a linear light source; a light guide plate 1908 for converting the linear light source into a planar light source to be projected onto the entire liquid crystal panel; and a polarization plate/diffusion member 1909 for aligning the polarization direction or removing the non-uniform illumination. A reference numeral 1905 in FIG. 19A schematically indicates a light beam which passes the back surface of the liquid crystal display section 1906.

The liquid crystal display device 1900, as one example of the display adopting the wavelength conversion light source as a light source, includes a liquid crystal display panel 1910 and the backlight illumination device for illuminating the liquid crystal display panel 1910 in a cabinet 1907 from the back surface. The light source of the backlight illumination device is made up of a plurality of laser light sources which include at least a red (R) light source, a green (G) light source and a blue (B) light source. Namely, the R light source, the G light source and the B light source emit laser light in red color, green color and blue color respectively. Among these laser light sources, the G light source made up of a pulse fiber laser device of the first through third embodiment of the present embodiment is adopted for the G light source.

For the R light source, adopted is a semiconductor laser device made of AlGaInP/GaAs series material having wavelength of 640 nm, and for the B light source, adopted is a semiconductor laser device made of GaN series material having wavelength of 450 nm. For the light source in Green color (G light source), adopted is a green color light source having a wavelength of 532 nm, as an application of the wavelength conversion light source device of any of the foregoing first through third embodiments.

Incidentally, the G light source is made up of the G light source of the first through third embodiments and an optical component such as a condenser lens (not shown) or other optical component, and is arranged so that a multi beam of output light is condensed to the optical fiber to be guided to the light guide plate.

According to the foregoing structure which adopts the pulse fiber laser device of high photoelectric transfer efficiency with a single high uniform output peak value, it is possible to realize an image display apparatus which realizes desirable color reproducibility with high luminance, which is excellent in color reproductively of low power consumption under stable composition with simple structure.

According to the conditions under which the device is used, the timing for executing the operation to deal with changes over time such as the element heating operation of the wavelength conversion element should be changed. According to the image display apparatus in accordance with the present embodiment, it is desirable that the operation to deal with changes over time be started after the operation of the display has been completed to avoid carrying out such operation to deal with changes over time while the display is being used by the user.

The operation to deal with the changes over time are carried out in two different ways 1) IN the case of the display for use in a handy type front projector, etc., and 2) In the case of the desk top back projection type display or liquid crystal display, etc. installed somewhere in the room.

In the case of 1) the movable display to be carried when used, generally, the power is not supplied in the non-operation mode. It is preferable that the optical apparatus be provided with the backup battery such as battery (capacitor) 203 as shown in the area surrounded by dotted lines in FIG. 5 so that the power for the recovery system can be ensured even when the power supply is plugged off immediately after turning OFF the power, and the power cannot be obtained externally.

On the other hand, in the case of the desk top display, generally the power is supplied even in the non-operation mode. Therefore, for such desk top display, it may be arranged so as to carry out the recovery operation using the external power supply.

As to the timing of starting the recovery operation, the recovery operation can be started when an overall operation time has reached the certain hours, or when a predetermined amount of shift in phase matching temperature is detected, other than the timing at which the display has been used.

Incidentally, the effects as achieved from the present invention is effective particularly when adopting as the material of the wavelength conversion element, an optical element having a polarization inversion structure, for example, optical crystals having the basic structure of the oxygen octahedral structure, and having added thereto a metal ion (Mg ion, etc.) other than the main component, such as Mg: $LiNbO_3$ of the congruent composition or the stoichiometric composition or Mg: $LiTaO_3$ of the congruent composition or the stoichiometric composition, Mg: $KTiOPO_4$, etc., as metal ions in the oxygen octahedral structure are unstable and lattice defects are liable to be generated.

According to the foregoing embodiments, explanations have been given through the case of adopting the wavelength conversion element utilizing the non-linear optical effects as one example of the optical element; however, other optical elements having a polarization inversion structure for matching an optical phase utilizing the period of polarization inversion structure, the optical apparatus having the structure of matching the light with the speed of microwaves and millimeter wave, etc., may be adopted.

Figure 20A:
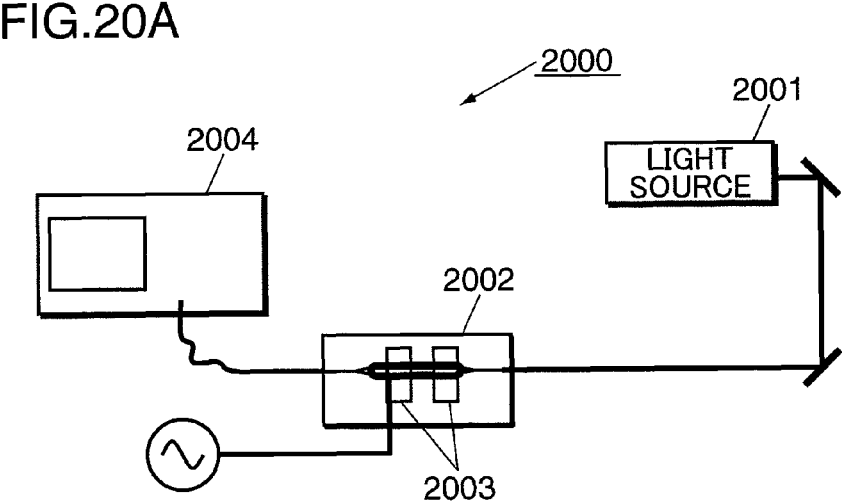
FIG. 20A is an explanatory view schematically showing the structure of a liquid crystal display adopting the laser light source in accordance with one embodiment of the present invention.

FIG. 20A schematically shows an optical communication device 2000. The optical communication device 2000 includes a light source 2001, an optical modulator 2002, and a receiver 2004. For the waveguide type modulator (for example, Mach-Zehnder interferometer) for millimeter waves in a range of 60 GHz to 110 GHz for use in the optical communication device 2000, utilizing the polarization inversion structure 2003 for matching the light which passes through the optical guide provided in Mg: $LiNbO_3$ of the congruent composition or the stoichiometric composition or Mg: $LiTaO_3$ of the congruent composition or the stoichiometric composition, with the phase speed of an electric signal as inputted from the modulation electrode 2006 directly above the optical guide 2005, the interaction effect between the light and the electric signal can be increased.

Here, as in the case of the wavelength conversion element, the deterioration over time due to light incident therein cause changes in half-wave voltage. It is therefore necessary to apply a bias voltage to a modulation signal, and an electric circuit needs to be provided separately from the optical modulator 2002, for always monitoring the modulation depth with respect to the bias voltage of the electric signal to determine an appropriate bias voltage.

Figure 20B:
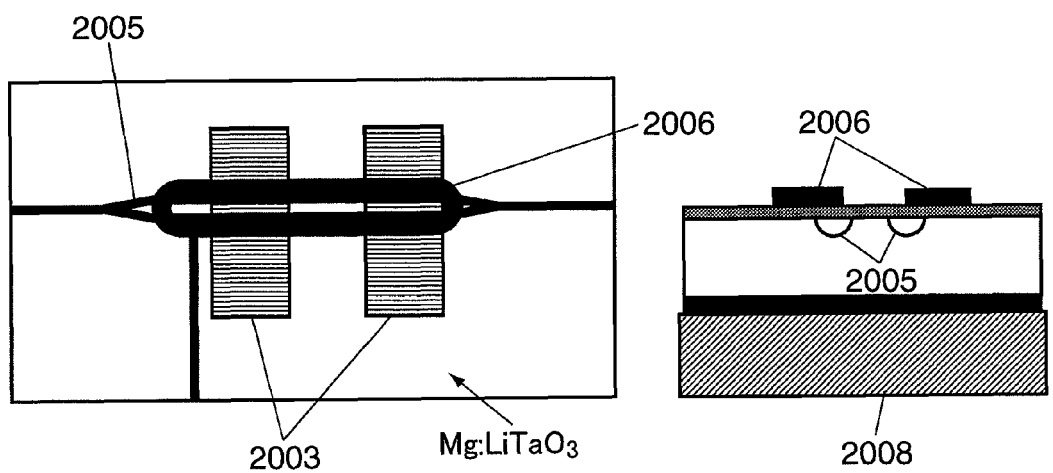
FIG. 20B is a cross-sectional view schematically showing the liquid crystal display in accordance with one embodiment of the present invention.

With this structure also, it is effective to carrying out the operation for recovering changes over time (heating operation adopting the element heating mechanism 2008 FIG. 20B) with respect to the optical element for use in forming the optical modulator 2002, to ensure the modulation operation without an applied bias voltage, thereby omitting the circuit for use in monitoring and determining the bias voltage when carrying out the modulation operation.

Other than the above structure, the problem of deteriorating the wavelength separation characteristic due to changes in refractive index of the waveguide over time occurs also for the separation element for separating the optical signal as inputted (WDW: Wavelength Division Multiplexing) in the case of forming the wage guide in the case for adopting the optical guide provided in Mg: $LiNbO_3$ of the congruent composition thereof, or the stoichiometric composition or Mg: $LiTaO_3$ of the congruent composition or the stoichiometric composition.

Namely, by carrying out the operation of recovering changes overtime with respect to optical element which constitutes the wavelength separation element, it is possible to prevent deteriorations in wavelength separation characteristic by recovering changes in refractive index overtime.

By preventing deterioration in wavelength separation characteristic over time in the foregoing manner, the following effect can be achieved. That is, with an application of an electric field or an ultraviolet light to green light (with a wavelength of around 550 nm) to the wavelength separation element made of Mg: $LiNbO_3$ of the congruent composition or the stoichiometric composition or Mg: $LiTaO_3$ of the congruent composition or the stoichiometric composition, it becomes possible to actively change the wavelength separation characteristic, thereby enabling an application to an optical router or other optical apparatus.

In the first embodiment, the wavelength conversion has been explained through the case of converting from an infrared light (1064 nm) to a visible light (532 nm). However, the wavelength conversion of the present invention can be used for other wavelength conversion such as sum frequency generation, difference frequency generation, and optical parametric oscillation, with an appropriate selection for the laser light source, etc., that uses the optical phase matching structure utilizing the periodical polarization inversion structure.

The present invention is suitably applied to optical apparatus, wavelength conversion laser light source, the laser device with fiber, and the image forming apparatus.

As described, the optical apparatus according to one aspect of the present invention includes: a non-linear optical crystal of an oxygen octahedral structure, having added thereto a metal ion in other components than a main component; a light source for projecting light into the non-linear optical crystal in an operation mode; and a refractive index recovery mechanism, which carries out a recovery operation in a non-operation mode in which light is not injected to the non-linear optical crystal with an applied external energy to the non-linear optical crystal, for recovering a refractive index of the non-linear optical crystal as shifted overtime due to light projected into the non-linear optical crystal in the operation model.

For the non-linear optical crystal, it is preferable to adopt $LiNbO_3$ or $LiTaO_3$ of congruent composition having added thereto not less than 5 mol of Mg or $LiNbO_3$, $LiTaO_3$, or $KTiOPO_4$ of stoichiometric composition having added thereto not less than 1 mol of Mg.

In the above structure, the congruent composition indicates a so-called congruent melting composition where the melting composition coincides with the mono-crystal composition obtained from the melt. The stoichiometric composition indicates a ideal ratio composition (ratio composition close to chemical formula).

In the non-linear optical crystal of the above compositions, lattice defects exist in crystals. In response, by adding a predetermined amount of Mg (not less than 5 mol of Mg in congruent composition and not less than 1 mole of Mg in stoichiometric composition), it is possible to reduce such lattice defects with Mg, which in turn reduces electrons trapped in lattice defects caused by the lattice defects, thereby preventing photorefractive phenomenon where a refractive index of light in the non-linear optical crystal changes instantaneously when projecting light in the non-linear optical crystal.

However, as a result of research by the inventors of the present application, the following problems that had not been known conventionally were revealed for the first time. Namely, the lattice defects can be reduced by adding the predetermined amount of Mg as described above; however, the lattice defects cannot be eliminated completely. Therefore, as the overall time in the operation mode becomes longer wherein light is projected in to the non-linear optical crystal, the refractive index of the non-linear optical crystal change gradually due to the electrons trapped in lattice defects. Once the refractive index of the non-linear optical crystals has changed over the operation of long period of time, the refractive index cannot be recovered merely by switching to the non-operation mode in which light is not projected into the non-linear optical crystal.

Particularly, after the overall operation time has reached the order of several hours to several hundreds hours, shifts from the initial refractive index become large, which makes it difficult for the non-linear optical crystal to generate non-linear optical phenomenon (wavelength conversion, etc.). As a result, a problem arises in that output power is reduced as the overall operation time becomes longer, and an operation cannot be performed under stable conditions over a long period of time.

In order to solve the foregoing problem that revealed for the first time, the optical apparatus of the foregoing structure of the present invention includes the refractive index recovery mechanism, which carries out a recovery operation in a non-operation mode in which light is not injected to the non-linear optical crystal with an applied external energy to the non-linear optical crystal, for recovering a refractive index of the non-linear optical crystal as shifted overtime due to light projected into the non-linear optical crystal in the operation model.

With the recovery operation by the refraction index recovery mechanism, electrons (or hole) trapped in lattice defects in the non-linear optical crystals are excited with an applied external energy, to release the electrons from the non-linear optical crystal, thereby recovering the refractive index of the non-linear optical crystals. As a result, it is possible to perform the wavelength conversion under stable conditions even over an overall operation time of long period of time.

With the foregoing structure, it is preferable that the refractive index recovery mechanism recovers the refractive index of the non-linear optical crystal with an applied thermal energy to the non-linear optical crystal as the external energy, and the optical apparatus further includes a temperature holding section for heating the non-linear optical crystal to a higher temperature than the operation temperature of the non-linear optical crystal in the operation mode and maintaining the non-linear optical crystal at the recovery temperature for a predetermined time.

According to the foregoing structure, the non-linear optical crystal is heated to a temperature higher than the operation temperature of the non-linear optical crystal in the operation mode and the non-linear optical crystal is maintained at the recovery temperature for a predetermined time. With this structure, electrons (hole) trapped in lattice defects in the non-linear optical crystals can be released from the non-linear optical crystal by the lattice vibrations based on thermal energy. As a result, the refractive index of the non-linear optical crystals can be recovered.

It is preferable that the recovery temperature is set to 80° C. or higher.

With this structure, it is possible to achieve the effect of recovering the refractive index of the non-linear optical crystal effectively.

It is preferable that the recovery temperature is set to 100° C. or higher.

With this structure, it is possible to achieve the effect of recovering the refractive index of the non-linear optical crystal more effectively.

It is preferable that the temperature holding section maintains the recovery temperature for 5 minutes or longer.

With this structure, it is possible to achieve the effect of recovering the refractive index of the non-linear optical crystal effectively.

With the foregoing structure, it is preferable that the refractive index recovery mechanism recovers the refractive index of the non-linear optical crystal with an applied ultraviolet ray energy to the non-linear optical crystal as the external energy; and the refractive index recovery mechanism includes an ultraviolet ray emitting section for emitting for 5 minutes or longer, the ultraviolet ray having a wavelength in a range of not less than 280 nm to not more than 380 nm, and an output power of not less than 100 mW.

With this structure, electrons (hole) trapped in lattice defects in the non-linear optical crystals are excited with an applied ultraviolet ray, to release the electrons from the non-linear optical crystal, thereby recovering the refractive index of the non-linear optical crystals.

With the foregoing structure, it is preferable that the refractive index recovery mechanism recovers the refractive index of the non-linear optical crystal with an applied electric energy to the non-linear optical crystal as the external energy; and said refractive index recovery mechanism includes an electric field applying section for applying an electric field generated with an application of a rectangular wave voltage of not less than 500 V and a frequency of not less than 10 Hz and a duty ratio of not less than 50% onto said non-linear optical crystal via the electrode for not less than 10 seconds.

With this structure, electrons (hole) trapped in lattice defects in the non-linear optical crystals are excited with an applied electric field, to release the electrons from the non-linear optical crystal, thereby recovering the refractive index of the non-linear optical crystals.

It is preferable that the non-linear optical crystal has a polarization inversion structure.

With this structure, by a design of the period of the polarization inversion structure, it is possible to determine the phase matching conditions, etc., of the non-linear optical crystal as desired.

With this structure, it is preferable that the refractive index recovery mechanism performs the recovery operation at timing of switching ON or OFF the power supply.

According to the foregoing structure, the recovery operation is performed each time the power supply is switched ON or OFF at the timing of operating the switch of the power supply, it is possible to reset the refractive index of the non-linear optical crystal each time the operation is started or terminated. As a result, it is possible to perform the operation under stable conditions over a long period of time.

With this structure, it is preferable that a backup power supply is further provided for operating the refractive index recovery mechanism after the power supply is shut off.

In the non-operation mode, it is liable that the power supply is shut off. According to the foregoing structure; however, it is possible to carry out the recovery operation by the refractive index recovery mechanism using the power supplied from the backup battery.

With this structure, it is preferable that the refractive index recovery mechanism includes a detection section for detecting changes in the non-linear optical crystal based on changes in phase matching condition of the non-linear optical crystal in the operation mode; and the refractive index recovery mechanism performs the recovery operation based on detection results of the detecting section.

With changes in refractive index of the non-linear optical crystal, phase matching conditions of the non-linear optical crystal in the operation mode change. In response, the detecting section detects changes in refractive index of the non-linear optical crystal based on changes in phase matching condition. With this structure, it is possible to recover the refractive index of the non-linear optical crystal based on the results of detection by the detecting section effectively without loss.

With this structure, it is preferable that the detecting section detects changes in refractive index of the non-linear optical crystal based on changes in an amount of current to be supplied to the light source under the control of constant output of the light emitted via the non-linear optical crystal.

Under the control of constant output of light emitted via the non-linear optical crystal, changes in current to be supplied to the light source change as one of the factors of changes in phase matching conditions. With this structure, it is possible to detect changes in refractive index of the non-linear optical crystal based on changes in amount of current with a simple structure.

With this structure, it is preferable that the detecting section detects changes in refractive index of the non-linear optical crystal based on changes in output of the light emitted via the non-linear optical crystal under the control of constant current amount to be supplied to the light source.

Under the control of constant current to be supplied to the light source, changes in output power of light emitted via the non-linear optical crystal change as one of the factors of changes in phase matching conditions. With this structure, it is possible to detect changes in refractive index of the non-linear optical crystal based on changes in output power with a simple structure.

With this structure, it is preferable that the refractive index recovery mechanism performs the recovery operation by switching from the operation mode to the non-operation mode after once terminating the light emission from the light source when said detecting section detects changes in refractive index of the non-linear optical crystal.

With this structure, the recovery operation is performed immediately after terminating the light emission from the light source at timing of detecting changes in refractive index. As a result, it is possible to reset the refractive index of the non-linear crystal effectively.

A wavelength conversion laser light source according to another aspect of the present invention includes the optical apparatus of any of the foregoing structures; and the wavelength conversion element including the non-linear optical crystal, for converting the wavelength of the light emitted from the light source into a laser light of different wavelength.

An image display apparatus according to another aspect of the present invention includes the wavelength conversion laser light source of the foregoing structure, a two-dimensional modulation element for two-dimensionally modulating the laser light emitted from the wavelength conversion light source; and a projection lens for projecting the laser light as modulated by the tow-dimensional modulation element.

According to the foregoing structure wherein the wavelength conversion light source is applied to the image display apparatus including the two-dimensional modulation element and the projection lens, it is possible to realize an image display apparatus which ensures quality image display under stable conditions over a long period of time.

An image display apparatus according to still another aspect of the present invention includes: the optical unit including the wavelength conversion laser light source of the foregoing structure; a liquid crystal panel; and a light guide member for guiding the light emitted from the light source unit to the liquid crystal panel.

According to the foregoing structure wherein the wavelength conversion light source is applied to the image display apparatus including the liquid crystal panel and the light guide member, it is possible to realize an image display apparatus which ensures quality image display under stable conditions over a long period of time.

An image display apparatus according to still another aspect of the present invention includes: a wavelength conversion laser light source which includes the optical apparatus of any of the foregoing structure; the wavelength conversion element including the non-linear optical crystal, for converting the wavelength of light emitted from the light source into a laser light of different wavelength; and a backup power supply for operating the refractive index recovery mechanism when the power supply is cut off, wherein the refractive index recovery mechanism performs the recovery operation at a timing of completing an image display operation.

According to the foregoing structure, the recovery operation is executed at timing of completing an image display operation. With this structure, the recovery operation is not executed while the user enjoys an image in the display, and it is therefore possible to recover the refractive index of the non-linear optical crystal to be suited to environmental conditions of use of the image display apparatus.

A laser light source device according to another aspect of the present invention includes the wavelength conversion laser light source of the foregoing structure; and a fiber for guiding a laser light emitted from the wavelength conversion laser light source into an irradiation area.

With this structure wherein the wavelength conversion laser light source is applied to the laser light source device with fiber, it is possible to realize a laser light source device which ensures operations under stable conditions over a long period of time.

This application is based on Japanese patent application serial No. 2008-170069 filed in Japan Patent Office on Jun. 30, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical apparatus, comprising:
a non-linear optical crystal of an oxygen octahedral structure, having added thereto a metal ion in other components than a main component;
a light source for projecting light into the non-linear optical crystal in an operation mode; and
a refractive index recovery mechanism for carrying out a recovery operation for recovering a refractive index of said non-linear optical crystal as shifted overtime due to light projected into the non-linear optical crystal in the operation mode with an applied external energy into the non-linear optical crystal in a non-operation mode in which light is not injected to the non-linear optical crystal.

2. The optical apparatus according to claim 1, wherein:
said non-linear optical crystal is $LiNbO_3$ or $LiTaO_3$ of congruent composition having added thereto not less than 5 mol of Mg or $LiNbO_3$, $LiTaO_3$, or $KTiOPO_4$ of stoichiometric composition having added thereto not less than 1 mol of Mg.

3. The optical apparatus according to claim 1, wherein:
said refractive index recovery mechanism recovers the refractive index of the non-linear optical crystal with an applied thermal energy to the non-linear optical crystal as the external energy,
said optical apparatus further comprising:
a temperature holding section for heating the non-linear optical crystal to a higher temperature than the operation temperature of the non-linear optical crystal in the operation mode and maintaining the non-linear optical crystal at the recovery temperature for a predetermined time.

4. The optical apparatus according to claim 3, wherein:
said recovery temperature is 80° C. or higher.

5. The optical apparatus according to claim 4, wherein:
said recovery temperature is 100° C. or higher.

6. The optical apparatus according to claim 4, wherein:
said temperature holding section maintains the recovery temperature for 5 minutes or longer.

7. The optical apparatus according to claim 1, wherein:
the refractive index recovery mechanism recovers the refractive index of the non-linear optical crystal with an applied ultraviolet ray energy to the non-linear optical crystal as the external energy; and
and the refractive index recovery mechanism includes an ultraviolet ray emitting section for emitting for 5 minutes or longer, the ultraviolet ray having a wavelength in a range of not less than 280 nm to not more than 380 nm, and an output power of not less than 100 mW.

8. The optical apparatus according to claim 1, wherein:
the refractive index recovery mechanism recovers the refractive index of the non-linear optical crystal with an applied electric energy to the non-linear optical crystal as the external energy; and
said refractive index recovery mechanism includes an electric field applying section for applying for not less than 10 seconds, an electric field generated with an application of a rectangular wave voltage of not less than 500 V and a frequency of not less than 10 Hz and a duty ratio of not less than 50% onto said non-linear optical crystal via the electrode.

9. The optical apparatus according to claim 1, wherein:
said non-linear optical crystal has a polarization inversion structure.

10. The optical apparatus according to claim 1, wherein:
the refractive index recovery mechanism performs the recovery operation at timing of switching ON or OFF the power supply.

11. The optical apparatus according to claim 1, further comprising:
a backup power supply for operating the refractive index recovery mechanism when a power supply is shut off.

12. The optical apparatus according to claim 1, wherein:
said refractive index recovery mechanism includes a detection section for detecting changes in the non-linear optical crystal based on changes in phase matching condition of the non-linear optical crystal in the operation mode; and
said refractive index recovery mechanism performs the recovery operation based on detection results of the detecting section.

13. The optical apparatus according to claim 12, wherein:
said detecting section detects changes in refractive index of the non-linear optical crystal based on changes in an amount of current to be supplied to the light source under the control of constant output of the light emitted via the non-linear optical crystal.

14. The optical apparatus according to claim 12, wherein:
said detecting section detects changes in refractive index of the non-linear optical crystal based on changes in output of the light emitted via the non-linear optical crystal under the control of constant current amount to be supplied to the light source.

15. The optical apparatus according to claim 12, wherein:
said refractive index recovery mechanism performs the recovery operation by switching from the operation mode to the non-operation mode after once terminating the light emission from the light source when said detecting section detects changes in refractive index of the non-linear optical crystal.

16. The wavelength conversion laser light source comprising:
said optical apparatus of claim 1; and
a wavelength conversion element including the non-linear optical crystal, for converting the wavelength of the light emitted from the light source into a laser light of different wavelength.

17. An image display apparatus, comprising:
the wavelength conversion laser light source of claim 16;
a two-dimensional modulation element for two-dimensionally modulating the laser light emitted from the wavelength conversion light source; and
a projection lens for projecting the laser light as modulated by the tow-dimensional modulation element.

18. An image display apparatus, comprising:
the optical unit including the wavelength conversion laser light source of claim 16;
a liquid crystal panel; and
a light guide member for guiding the light emitted from the light source unit to the liquid crystal panel.

19. An image display device, comprising:
a wavelength conversion laser light source which includes:
the optical apparatus of claim 1;
the wavelength conversion element including the non-linear optical crystal, for converting the wavelength of light emitted from the light source into a laser light of different wavelength; and
a backup power supply for operating the refractive index recovery mechanism when the power supply is cut off, wherein:
the refractive index recovery mechanism performs the recovery operation at a timing of completing an image display operation.

20. A laser light source device, comprising:
the wavelength conversion laser light source of claim 16; and
a fiber for guiding a laser light emitted from the wavelength conversion laser light source into an irradiation area.

* * * * *

UNITED STATES PATENT AND TRADEMARK OFFICE
CERTIFICATE OF CORRECTION

| | |
|---|---|
| PATENT NO. | : 7,848,010 B2 |
| APPLICATION NO. | : 12/494947 |
| DATED | : December 7, 2010 |
| INVENTOR(S) | : Hiroyuki Furuya et al. |

It is certified that error appears in the above-identified patent and that said Letters Patent is hereby corrected as shown below:

In column 29, claim 17, line 8, "tow-dimensional" should read --two-dimensional--.

Signed and Sealed this
Twenty-sixth Day of April, 2011

David J. Kappos
*Director of the United States Patent and Trademark Office*